United States Patent [19]

Richardson

[11] Patent Number: 5,043,887

[45] Date of Patent: Aug. 27, 1991

[54] AUTOMATIC ELECTRONIC DOWNLOADING OF BINGO CARDS

[75] Inventor: John Richardson, San Diego, Calif.

[73] Assignee: Selectro-Vision, Ltd., San Diego, Calif.

[21] Appl. No.: 329,580

[22] Filed: Mar. 28, 1989

[51] Int. Cl.[5] ............................................. G06F 15/44

[52] U.S. Cl. .................................... 364/410; 273/237; 273/269

[58] Field of Search ....................... 364/410, 411, 412; 273/237, 269, 274, 284, 138 A

[56] References Cited

U.S. PATENT DOCUMENTS

| | | | |
|---|---|---|---|
| 4,365,810 | 12/1982 | Richardson | 273/237 |
| 4,378,940 | 4/1983 | Gluz et al. | 273/237 |
| 4,455,025 | 6/1984 | Itkis | 273/237 |
| 4,475,157 | 10/1984 | Bolan | 364/410 |
| 4,547,851 | 10/1985 | Kurland | 364/410 X |
| 4,624,462 | 11/1986 | Itkis | 273/269 X |
| 4,636,951 | 1/1987 | Harlick | 364/412 |
| 4,650,981 | 3/1987 | Foletta | 235/449 |
| 4,651,995 | 3/1987 | Henkel | 273/237 |
| 4,661,906 | 4/1987 | DiFrancesco et al. | 273/269 X |
| 4,669,730 | 6/1987 | Small | 273/138 A |
| 4,747,600 | 5/1988 | Richardson | 273/269 |
| 4,768,151 | 8/1988 | Birenbaum et al. | 364/410 |
| 4,798,387 | 1/1989 | Richardson | 273/237 |
| 4,848,771 | 7/1989 | Richardson | 273/237 |
| 4,856,787 | 8/1989 | Itkis | 273/237 |
| 4,875,686 | 10/1989 | Timms | 273/237 |
| 4,882,688 | 11/1989 | Kondziolka et al. | 364/519 |
| 4,885,700 | 12/1989 | Kondziolka et al. | 364/519 |
| 4,909,516 | 3/1990 | Kolinsky | 273/237 |

*Primary Examiner*—Jerry Smith

*Assistant Examiner*—David Huntley

*Attorney, Agent, or Firm*—Fitch, Even, Tabin & Flannery

[57] ABSTRACT

An electronic gaming system for playing games which includes a system base station and a plurality of gaming boards. The system base station downloads game instructions, a game schedule, and game card arrays into the gaming boards. These game card arrays are stored in the system base station as a gaming card library. The gaming card library contains a plurality of game card arrays such that no two arrays are identical. Each game card array is stored as a single record containing the elements of a particular array, while the individual enjoys instantaneous access to a plurality of gaming cards. The game schedule stores symbols which are to be matched with randomly generated symbols, particularly where the symbols are numbers and the pattern is a plurality of elements of a $5 \times 5$ array.

4 Claims, 20 Drawing Sheets

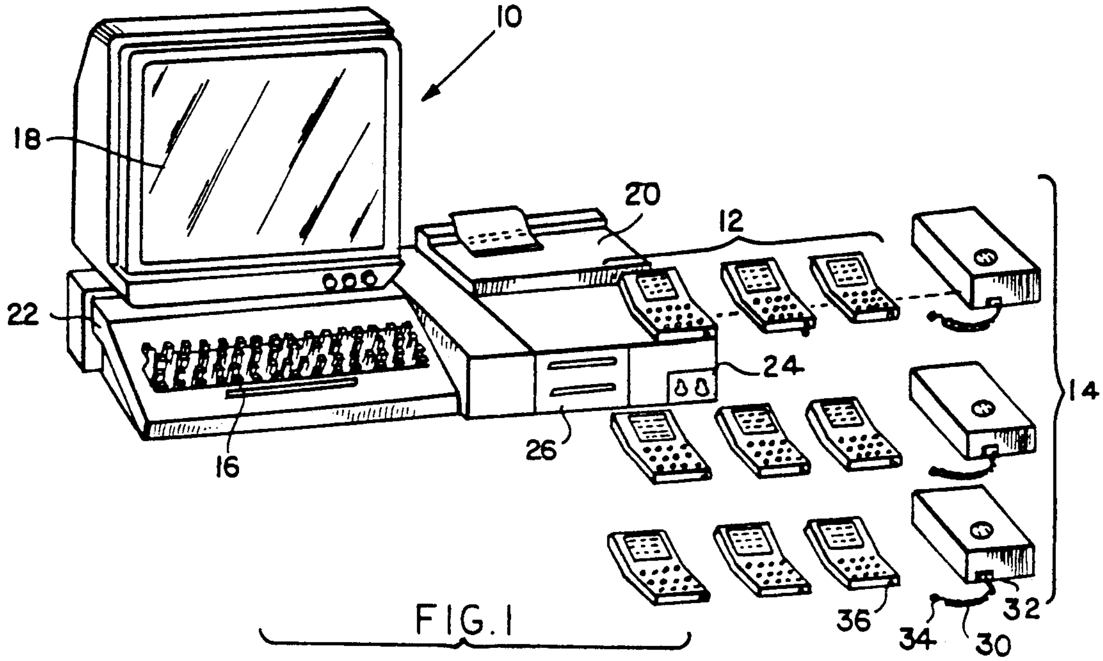
FIG. 1
FIG. 9
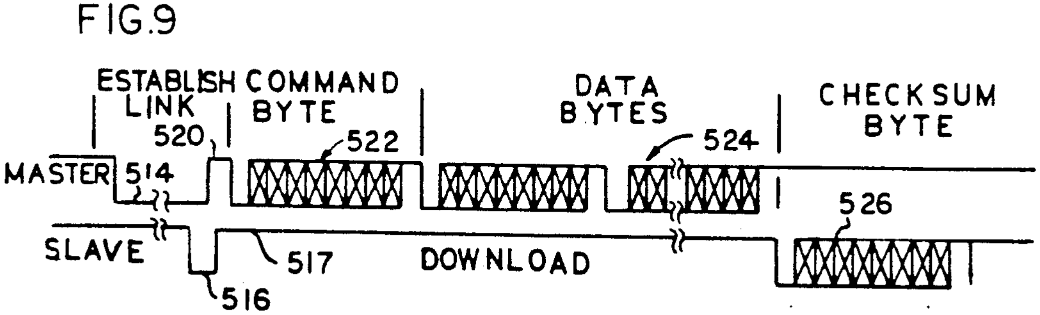
FIG. 10
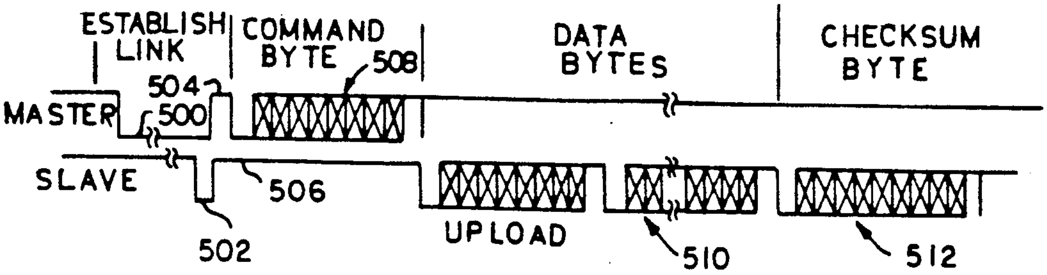

HARDWARE DIAGRAM
SYSTEM BASE STATION 10

```
############# PLAYER RECEIPT #############
   ITEM              QTY         AMT

REGULAR CARDS         10        $20.00
SPECIAL CARDS          6        $18.00
                                ======
                 TOTAL          $38.00
                 CASH IN        $40.00
                 CHANGE          $2.00

THANK YOU FOR PLAYING BINGO... GOOD LUCK

        CARD (S) SERIAL NUMBER   SN007
```

FIG. 23

```
   SUMMARY REPORT FOR BINGO SESSION

             BINGO SALES
NO. OF CUSTOMER______________ 1
TOTAL REGULAR CARDS SOLD_______ 10
TOTAL SPECIAL CARDS SOLD_______ 6
TOTAL INSTANT BINGO CARDS SOLD__ 0
TOTAL BINGO SALES_________   $38.00

             OTHER SALES
NO. OF SALES________________ 0
TOTAL AMOUNT____________      $0.00
TOTAL SALES___________       $38.00

              PAYOUTS
TOTAL BINGO PAYOUT AMOUNT__  $200.00
TOTAL BONUSES PAID_______      $0.00
TOTAL OTHER PAYOUTS______      $0.00
TOTAL REFUNDS____________      $0.00
TOTAL PAYOUTS____________    $200.00

NET INCOME/LOSS________(     $162.00 )
```

FIG.24

```
############# BINGO PRICES #############
DISCOUNT PERCENTAGE     50%
PRICE FOR MINIMUM SALE              $10.00

UNIT PRICE FOR REGULAR CARDS         $2.00
UNIT PRICE FOR SPECIAL CARDS         $3.00
```

FIG. 25

```
########## INSTANT BINGO DATA ##########
 1 FOR $1.00   OR   6 FOR    $5.00

INSTANT BINGO FORMAT: REGULAR BINGO
NO. OF PUSHES FOR WIN:  13
PAYOUT AMOUNT: $5.00
```

FIG. 26

```
############ PACKAGE DEAL DATA ##########
     TOTAL NUMBER OF PACKAGE DEALS  5

          PACKAGE DEAL NO. 1
REGULAR CARDS          8
SPECIAL CARDS          4
INSTANT BINGO          6
PRICE              $13.00

          PACKAGE DEAL NO. 2
REGULAR CARDS          8
SPECIAL CARDS          6
INSTANT BINGO          6
PRICE              $15.00

          PACKAGE DEAL NO. 3
REGULAR CARDS         10
SPECIAL CARDS          8
INSTANT BINGO         12
PRICE              $16.50

          PACKAGE DEAL NO. 4
REGULAR CARDS         16
SPECIAL CARDS          8
INSTANT BINGO         12
PRICE              $27.50

          PACKAGE DEAL NO. 5
REGULAR CARDS         20
SPECIAL CARDS         12
INSTANT BINGO         12
PRICE              $35.00
```

FIG.27

******** FORMAT LIBRARY ****

| NUMBER | NAME | PATTERN VALUE |
|---|---|---|
| 1 | REGULAR BINGO | 12 |
| 2 | REG. INCL 4 CORS | 13 |
| 3 | P. 1 LAYER CAKE | 3 |
| 4 | P. 2 LAYER CAKE | 3 |
| 5 | FULL LAYER CAKE | 1 |
| 6 | P. 1 OUTSIDE SQ. | 4 |
| 7 | P. 2 OUTSIDE SQ. | 6 |
| 8 | P. 3 OUTSIDE SQ. | 4 |
| 9 | FULL OUTSIDE SQ. | 1 |
| 10 | INSIDE SQUARE | 1 |
| 11 | COVER ALL BLKOUT | 1 |
| 12 | P. 1 RAIL.TRACKS | 2 |
| 13 | RAILROAD TRACKS | 1 |
| 14 | 5 NUMBER BINGO | 8 |
| 15 | 9 IN A SQUARE | 9 |
| 16 | CRAZY KITE | 4 |
| 17 | STAMPS DIAGONAL | 2 |
| 18 | CUPID'S ARROW | 1 |
| 19 | CRAZY LETTER "E" | 4 |
| 20 | CRAZY LETTER "F" | 6 |
| 21 | CRAZY LETTER "H" | 2 |
| 22 | CRAZY LETTER "L" | 4 |
| 23 | CRAZY LETTER "S" | 2 |
| 24 | CRAZY LETTER "T" | 4 |
| 25 | LETTER "X" | 1 |
| 26 | CRAZY LETTER "Z" | 2 |
| 27 | NUMBER 7 | 1 |
| 28 | LARGE DIAMOND | 1 |
| 29 | SML DIA OR CROSS | 1 |
| 30 | SMALL CROSS/4 COR | 1 |
| 31 | BRACKET | 1 |
| 32 | H I | 1 |
| 33 | LARGE CROSS | 1 |
| 34 | HOUR GLASS | 1 |
| 35 | HOUSE | 1 |
| 36 | DOUBLE CROSS | 1 |
| 37 | SNOWFLAKE | 1 |
| 38 | TREETOP | 1 |
| 39 | LORRAINE CROSS | 1 |
| 40 | TEST | 1 |
| 41 | CHECKERBOARD | 1 |
| 42 | CRAZY LETTER 'S' | 2 |
| 43 | **************** | |
| 44 | **************** | |
| 45 | **************** | |

FIG. 28

*************** GAME FORMAT

| NUMBER | NAME | PATTERNS |
|---|---|---|
| 43 | LETTER J | 1 |

| | B | I | N | G | O |
|---|---|---|---|---|---|
| 1 | *** *** | *** *** | *** *** | *** *** | *** *** |
| 2 | | | *** *** | | |
| 3 | | | *** *** | | |
| 4 | *** *** | | *** *** | | |
| 5 | *** *** | *** *** | *** *** | | |

FIG. 29

GAME SCHEDULE DATA

| R/S | GAM | LEV | FORMAT NAME | PAYOUTS | |
|---|---|---|---|---|---|
| R | 1 | 1 | REGULAR BINGO | 1 | 200.00 |
| | | | | 2 | 50.00 |
| S | 2 | 1 | LETTER "X" | 1 | 150.00 |
| | | | | 2 | 50.00 |
| R | 3 | 1 | P. 1 OUTSIDE SQ. | 1 | 20.00 |
| R | 3 | 2 | P. 2 OUTSIDE SQ. | 1 | 30.00 |
| R | 3 | 3 | P. 3 OUTSIDE SQ. | 1 | 40.00 |
| R | 3 | 4 | FULL OUTSIDE SQ. | 1 | 150.00 |
| R | 4 | 1 | REGULAR BINGO | 1 | 50.00 |
| R | 4 | 2 | COVER ALL BLKOUT | 1 | 150.00 |
| | | | | 2 | 50.00 |
| R | 5 | 1 | 5 NUMBER BINGO | 1 | 150.00 |
| | | | | 2 | 75.00 |
| S | 6 | 1 | STAMPS DIAGONAL | 1 | 200.00 |
| | | | | 2 | 50.00 |
| R | 7 | 1 | REG. INCL 4 CORS | 1 | 150.00 |
| | | | | 2 | 50.00 |
| R | 8 | 1 | SMALL CROSS/4 COR | 1 | 125.00 |
| | | | | 2 | 75.00 |
| R | 9 | 1 | CRAZY LETTER "T" | 1 | 200.00 |
| | | | | 2 | 50.00 |
| S | 10 | 1 | COVER ALL BLKOUT | 1 | 250.00 |
| R | 11 | 1 | REGULAR BINGO | 1 | 175.00 |
| | | | | 2 | 50.00 |
| R | 12 | 1 | 9 IN A SQUARE | 1 | 200.00 |
| | | | | 2 | 50.00 |
| S | 13 | 1 | LARGE DIAMOND | 1 | 200.00 |
| | | | | 2 | 50.00 |
| S | 14 | 1 | COVER ALL BLKOUT | 1 | 200.00 |
| | | | | 2 | 50.00 |

FIG. 30

AUTOMATIC ELECTRONIC DOWNLOADING OF BINGO CARDS

BACKGROUND OF THE INVENTION

This invention pertains generally to electronic gaming devices and more particularly to a microprocessor-based disk operating system capable of efficiently storing a library of gaming cards which can be electronically downloaded from the library into individual gaming boards, as for playing bingo.

Gaming cards are used in bingo and similar games of chance. The individual elements of the cards are covered by respective players pursuant to numbers generated by a random number generating device, as by drawing numbers from a hat. In bingo, the gaming card is in the form of a 5×5 array of numbers, with the centermost location being blank or termed a "free space." The game is generally played with 75 or 90 numbers, where each column in the array is limited to one-fifth of the numbers; e.g., if the selected numbers are to range from 1 to 75, then the first column numbers are taken from the group 1 to 15; if the selected numbers are to range from 1 to 90, then the numbers in the first column will range from 1 to 18. In a similar fashion, the second column numbers are taken from the group 16 to 30 or the group 19 to 36, as the case may be, and so on. There are no duplicate numbers on the gaming card.

Before the commencement of a game, the operator specifies what constitutes a winning pattern on the gaming card. The specified pattern may be an X, T, L, a diagonal line, a horizontal line, a vertical line, four corners, and so on. Game participants attempt to achieve the specified pattern by matching the randomly-drawn numbers with the numbers on their game cards.

For instance, in one game, a winning pattern may be a diagonal line and the randomly-drawn numbers may be in the range from 1 to 75. If a number drawn coincides with a number on a player's board, the player marks the position on his board. The first player to have board markings which coincide with the winning pattern is the winner of the game.

Several of these games, normally between twelve and eighteen, constitute a bingo program or session. Such an event is normally played over the course of several hours. Aside from an occasional intermission, the games are usually played consecutively and without significant interruption.

Traditionally, these games have been played with gaming cards formed of paper boards containing printed numerical arrays. These gaming cards are distributed at the beginning of a gaming session. Players select from a large number of boards and, therefore, are unable to create and play with an array of their own choosing and determination. While some games have been played with blank paper boards that the player fills in with numbers of his own choosing, the cards can be used only once since the player marks out the called numbers with an ink dauber or like means. This type of random array selection results in inefficiency of operation for playing consecutive games on a minimum interruption basis.

This inefficiency affects not only the game operator, who must check a copy of the marked paper boards which are collected to avoid an unauthorized change in the numbers once the game has started, but also the player, who must prepare a new board prior to the start of each game. These actions require time and detract from the desired even, and essentially uninterrupted, flow of a successful bingo program. It is mainly for these reasons that the blank board approach has been used only for single games and then generally for the first game of the bingo program.

Recently, electronic gaming boards have been developed to overcome many of the limitations inherent in traditional paper bingo cards. These electronic boards can display the shape of the winning pattern to be formed from the randomly-called numbers and signal the player when a winning array has been achieved. An electronic gaming board of this type is more fully described in U.S. Pat. No. 4,365,810, issued to John Richardson on Dec. 28, 1982. Other advantageous electronic gaming boards include those disclosed in U.S. Pat. No. 4,848,771, issued to John Richardson entitled, "Automatic Gaming System"; U.S. Pat. No. 4,798,387, issued to John Richardson, entitled "Multiple Gaming Board"; and U.S. Pat. No. 4,747,600, issued to John Richardson entitled "Gaming Board with Instant Win Feature". "Gaming Board with Instant Win Feature" provides for the storage of a complex gaming schedule to produce arbitrary win patterns with multiple level and place formats. The disclosures of these patents are expressly incorporated herein by reference.

Even with the improvement brought about by electronic gaming boards, the play during a bingo gaming session has become much more complex. More and different types of games are being played today than just the five across, up or down of the traditional bingo game. Specialized win patterns for each game are becoming commonplace, and it is difficult to provide a multiplicity of patterns on electronic gaming boards by using individual select switches because of the large number of possible patterns.

Oftentimes there are multiple win patterns or levels that build to a final payoff. For example, the final win pattern may be three completely filled horizontal bars comprising the first, third, and fifth rows of a card. A first level win pattern may be the fifth row, the second level win pattern may be the fifth and first rows, and the third level win pattern or final payoff is given to the first player to completely fill all three bars. It is difficult with presently-configured electronic gaming boards to conveniently play different game levels.

Many bingo gaming sessions today offer cash prizes for first, second, and third place winners. For instance, the first person to match a particular pattern receives a substantial first prize, a lesser amount is awarded to the second person to match the same pattern, and the third person to match the pattern might receive a relatively insignificant cash award. These place games are very difficult to implement on prior-art gaming systems.

Game participants will generally play several game cards at a time. It is advantageous to the operator of a gaming session to accommodate such inclination in order that he may sell as many game cards as possible, but additional game cards create control and audit problems. Previously, the operator of a gaming session has been without any knowledge of the actual cards being used by the respective participants. Moreover, the participants must locate entries on a number of cards and simultaneously watch for the winning pattern. If the winning pattern varies from game to game, the task can become truly formidable, resulting in an inefficient gaming operation. To retain control, the operator of the gaming session must be able to maintain an accurate record of the cards which have been sold throughout the course of an evening.

The increased volume of card sales demands a more efficient distribution mechanism. Existing electronic gaming boards require players to input numbers laboriously into their gaming boards, or to wait as a random number generator fills their cards. This procedure is time-consuming, precluding additional card sales.

Electronic gaming boards have created the need for a quick, easy means by which the gaming operator can produce and transfer large numbers of gaming cards, as well as complex gaming schedules, into the gaming boards. The gaming session operator further requires assistance in formulating the complex gaming schedule from one session to the next. A gaming system which is designed to improve the efficiency of a typical bingo gaming session should provide gaming boards which cannot be changed. Furthermore, the board should be designed for quick, easy verification of winning claims. The system should provide an indication that the gaming board was acquired for use in the particular program being conducted. Additionally, because each individual game during a typical bingo session generally requires a different shape for the winning pattern, it would be desirable for the player to have the shape of a winning array displayed promptly on his board and to be provided with an automatic indication when a match for that pattern is achieved.

Under prior electronic bingo gaming systems, a number of deceptions can be practiced. For instance, in some systems, it has been possible for a player to generate favorable cards on an electronic gaming board as the random numbers were announced. It has also been possible for a player to use an old game card in a new game, or to utilize electronic means to "verify" an improperly secured "win." Unscrupulous players might attempt to collect prize money by playing on electronic gaming boards from other bingo gaming operations. Similarly, game participants could modify the electronic gaming boards to enhance the chances of winning. Therefore, electronic gaming systems must provide security checks to ensure that allegedly-winning electronic gaming boards belong to the gaming system in question and have not been modified. Otherwise, the profitability of an entire bingo operation may be jeopardized.

SUMMARY OF THE INVENTION

The present invention solves these and other problems for a bingo gaming session, or the like, by providing an electronic gaming board which can be used by a player to receive a plurality of game cards from a library of game cards automatically, while providing numerous control and auditing functions. This invention takes the form of an automatic gaming system comprised of a system base station and a plurality of electronic gaming boards. This unique base station provides automatic means by which to download a plurality of gaming cards from a gaming library created beforehand into each of respective individual gaming boards. This feature obviates the time-consuming and cumbersome manual task of creating and entering values into the 24 array positions in each gaming card. Furthermore, this downloading feature allows the base station to retain auditing information about the distributed gaming cards; thus, the base station can instantly confirm matches between the randomly-called numbers and those on a winning card, and at the same time verify that such a card was indeed sold.

The system base station preferably includes a microprocessor-based disk operating system which runs an interactive application program receiving operator inputs and providing system control, communications, and auditing functions for the electronic gaming cards. Interactive with the human operator, the system base station receives information and performs supervisory functions such as distributing the game cards, storing the distributed game cards in memory, and validating potentially winning cards.

The complex interactive routine wherein gaming cards are downloaded from a library of cards to the individual player's gaming board is a primary aspect of the invention. A plurality of gaming cards are created beforehand and stored as a library in a random access file, on either a hard disk or floppy disk of the base computer. By utilizing an offset procedure, the 24 numbers for each array, ranging from 1 to 75 (or 1 to 90), are packed into 12 bytes. In a total of 600,000 bytes, 50,000 gaming cards are stored, each 12 bytes long.

The gaming cards are downloaded into a respective player's gaming board or handset as a string of 1024 bytes. The first 528 bytes contain instructions to be executed by the gaming board, while the remaining bytes provide the data for up to 40 gaming card arrays. The communication between the base computer and the handset is based upon a special asynchronous serial communications routine.

One aspect of the invention is using the system base station in conjunction with the gaming card library to instantaneously provide gaming card arrays to be downloaded into the individual gaming units. Another aspect of the invention is using the base station gaming card library to maintain valuable control and auditing information.

These and other objects, features, and aspects of the invention will become apparent in the following detailed description, particularly when considered in conjunction with the accompanying drawings.

BRIEF DESCRIPTION OF DRAWINGS

FIG. 1 is an isometric representation of an electronic gaming system, including electronic gaming boards, which is constructed in accordance with the invention;

FIG. 9 is an illustration of the waveforms for serial data communications downloading information into the electronic gaming boards illustrated in FIG. 1;

FIG. 10 is an illustration of the waveforms for serial data communications unloading information from the electronic gaming board illustrated in FIG. 1;

DETAILED DESCRIPTION OF PREFERRED EMBODIMENTS

Figure 2:
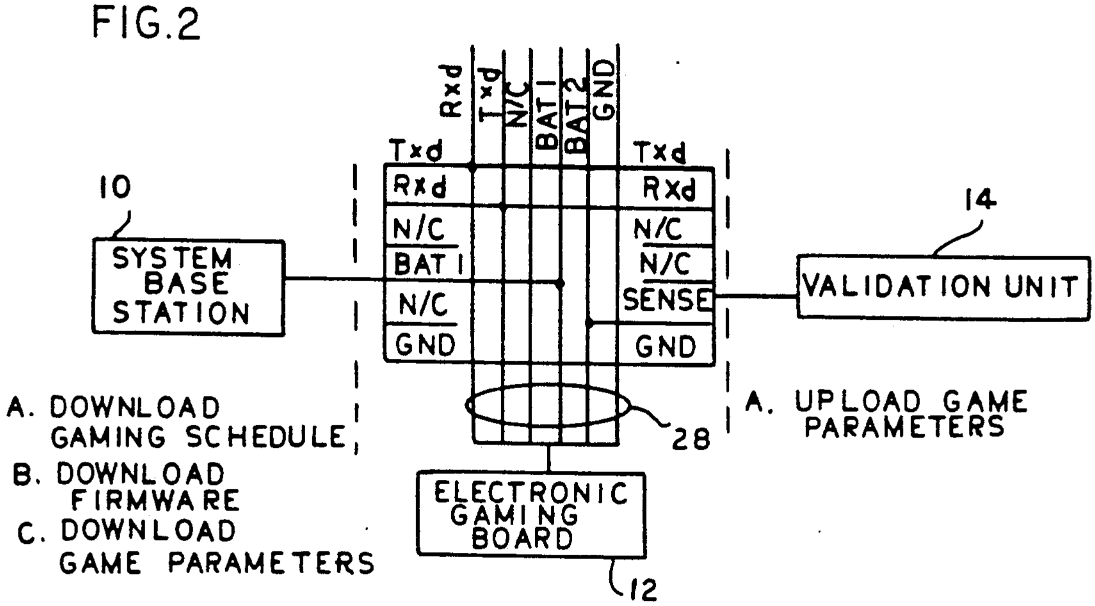
FIG. 2 is a block diagram of the electronic gaming system illustrated in FIG. 1, showing electrical connections between the gaming board and either a system base station or a validation unit.

FIG. 1 is a pictorial representation of an electronic bingo system constructed in accordance with the invention. The electronic bingo system comprises three major components, a system base station 10, a plurality of electronic gaming boards 12 in the form of handsets, and a plurality of validation units 14.

Any gaming board 12 can communicate with either the system base station 10 or a validation unit 14 through a serial digital communications interface established by a cable 30 which plugs into a socket 36 on the gaming board 12. The communications between the base station 10 and the gaming board 12 is based upon the asynchronous RS-232 serial communications standard. Socket 36 is a six-pin telephone socket. The cable 30 has male telephone plugs 32 and 34 on its respective ends. A validation unit 14 can be connected to a gaming board 12 adaptor plug 36 by the cable 30 which connects to a mating socket 33 of the validation unit 14.

With reference to FIG. 2, the pins of the socket 36 form a serial data transmit line Txd, a serial data receive line Rxd, two low voltage detection lines BAT1, BAT2, a nonconnected pin NC, and ground. These pins are connected by the leads of cable 30 to corresponding pins of the cradle 24 and the jacks 34 of the validation units 14, except that the cradle 24 provides no connection (N/C) corresponding to the BAT2 lead and the jacks 34 provide no connection (N/C) to the BAT1 lead.

Figure 3:
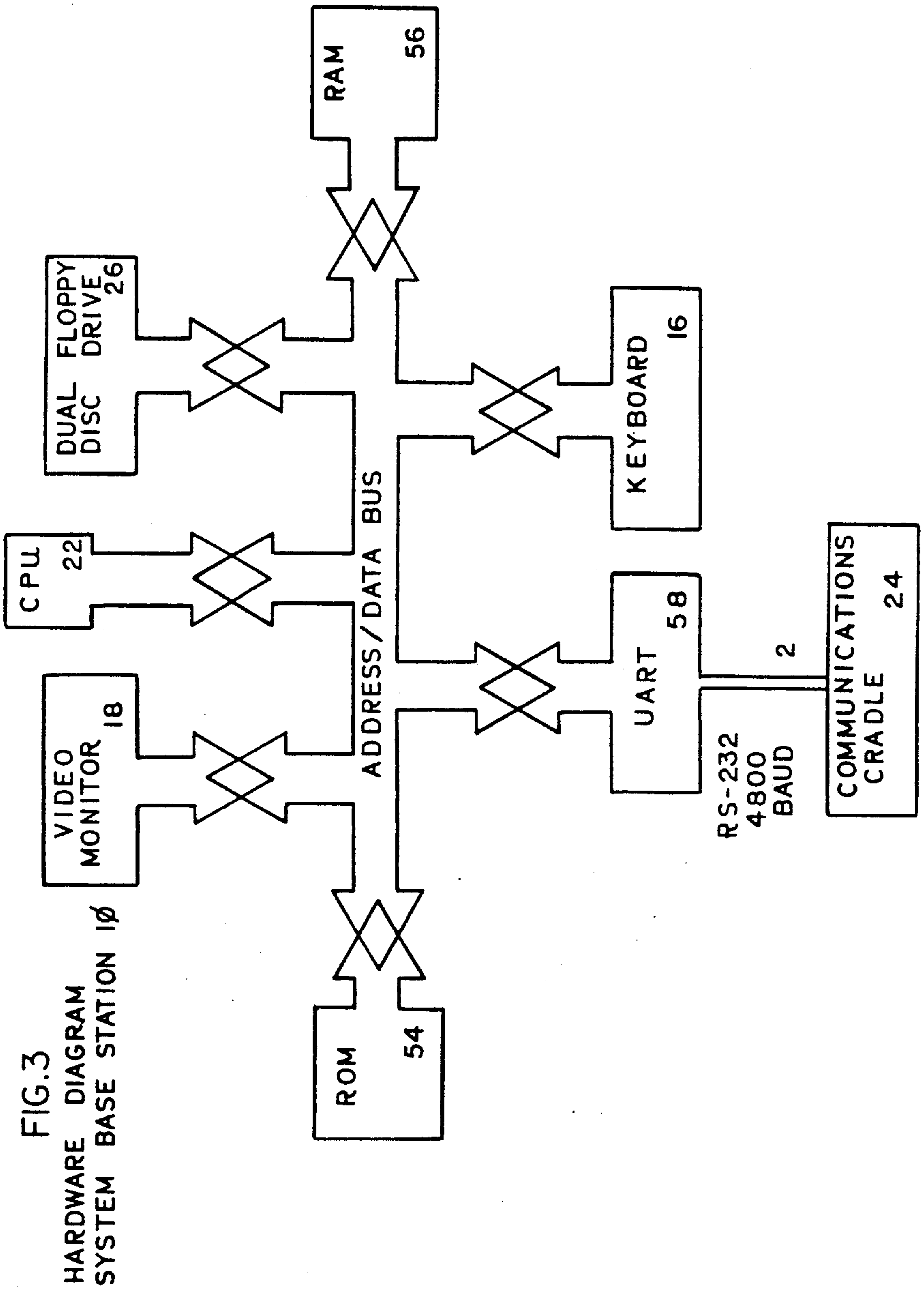
FIG. 3 is a block diagram of the system base station used in the system shown in FIG. 1.

As best shown in FIGS. 1 and 3, the system base station 10 includes a video monitor 18, a central processing unit (CPU) 22, a dual floppy disk drive 26, read-only memory (ROM) 54, random-access memory (RAM) 56, a keyboard 16, a universal asynchronous receiver transmitter (UART) 58, and a communications cradle 24. These devices are configured as a data processing system.

The system base station 10 is microprocessor-controlled, functioning as a point-of-sale terminal and accounting center. The system base station 10 uses the communications cradle unit 24 to interface with any of the electronic gaming boards 12 or any of the validation units 14 such that data can be transferred between the devices. The electronic gaming boards 12 are used by respective players in place of physical paper cards and markers which traditionally have been used in the game of bingo.

The system base station 10 stores data in the dual floppy disk drive 26, the ROM 54, and the RAM 56. The dual floppy disk drive stores a library of gaming cards comprised of a plurality of individual game card arrays. ROM 54 stores the gaming board instructions which direct the gaming boards 12 to store the game card arrays in the appropriate areas of gaming board memory. The RAM 56, in conjunction with the CPU 22, assembles a base station program which contains game card arrays as well as the gaming board instructions.

The library of gaming cards may be produced by means of a predetermined algorithm. Such an algorithm should eliminate the possibility of generating two identical game card arrays. However, the algorithm must preferably meet a more stringent requirement. It is critical to note that the individual game card arrays are stored in the gaming card library as a sequence of records, and that these records are then downloaded sequentially into the gaming boards 12, one gaming board at a time. Therefore, a game player who purchases several game card arrays will obtain a set of arrays which are stored at adjacent locations in the gaming card library. If the predetermined algorithm generates a sequence of gaming card arrays such that substantial similarities exist between any two adjacent arrays, the game player could end up purchasing 40 gaming cards which are virtually identical. Granted, one or two numbers in each of these 40 arrays may be different, but the player may justifiably feel as if he is essentially playing the same card 40 times over. Therefore, the algorithm should ensure that there are substantial differences between arrays situated at adjacent records within the gaming card library.

Another method of producing the gaming card library is to use a random number generator. However, the operator should ensure that no two game card arrays are identical prior to their inclusion in the gaming card library. Such a procedure may prove time-consuming. However, the random number generator method avoids a problem inherent with many predetermined algorithms in the context of the present embodiment. Use of a random number generator is likely to result in adjacent game card arrays which differ substantially from one another. Thus, sequential downloading of the game card arrays from the gaming card library will provide the game player who purchases multiple cards with substantially different arrays.

The system base station 10 may be employed to create the gaming card library, regardless of which production method is chosen. Since the system base station 10 is a microprocessor-based disk operating system capable of running interactive applications and routines, receiving operator inputs, and processing data, the base station 10 is capable of executing a wide range of commonly-available routines and algorithms for generating random or quasi-random numbers.

Once the array numbers for the gaming card library are generated, these numbers are transferred to memory within the disk drive 26. As will be described in more detail hereinafter, each individual game card array is stored within 12 bytes. Therefore, a typical floppy disk which holds over 300,000 bytes of storage space will be able to accommodate 300,000 bytes divided by 12 bytes per record, or 25,000 individual game card arrays. Since each gaming board 12 can store up to 40 game card arrays, a gaming card library consisting of one or two floppy disks is likely to satisfy most any system application.

Figure 4:
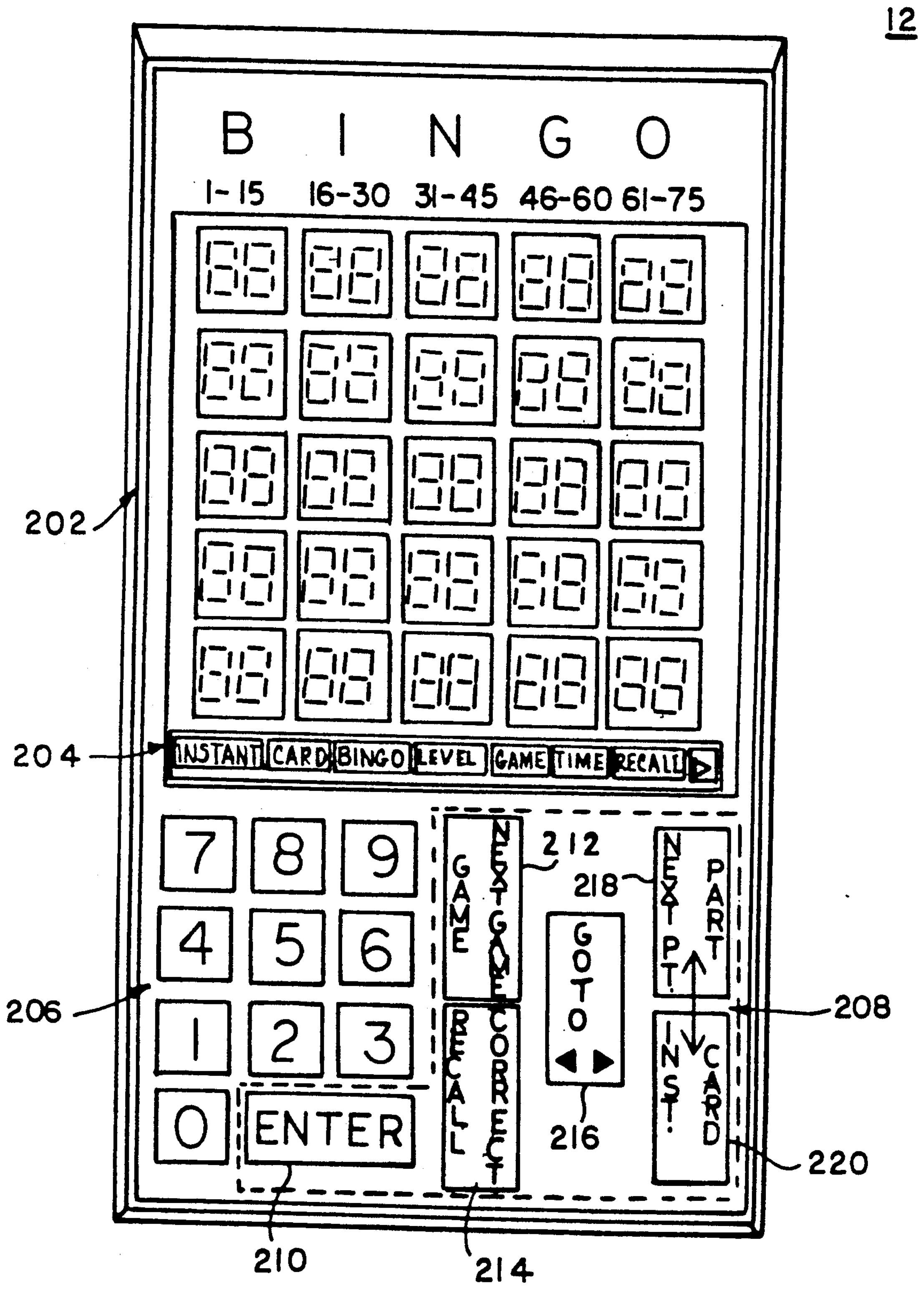
FIG. 4 is a plan view of the electronic gaming board illustrated in FIG. 1.

FIG. 4 depicts a plan view of the electronic gaming board handset 12. The gaming board 12 is essentially divided into four main sections. First, there is a liquid crystal display (LCD) section 202 with 25 array symbol display spaces, each having two 7-segment digital displays. Preferably, the display is in the form of a 5×5 array of rows and columns forming a bingo card which can be used to display the numbers of a bingo card or other types of information. The second section 204 is an LCD annunciator bar divided into a plurality of status and mode indicators. The annunciators indicate schedule status, i.e., the game, card, and level numbers of the game presently in play. Three additional annunciators indicate gaming board mode, i.e. instant bingo mode, recall called numbers mode, and bingo mode. A Go To/Shift (Arrow) annunciator 216 indicates a transfer or shift to special functions.

The third section of the gaming board 12 is a decimal membrane-type key pad 206 for entering digits 0–9 into the board. The fourth section 208 allows the player to operate the gaming board 12 by providing a plurality of membrane-type function keys. In this particular gaming board 12, there are six function keys, providing the player with convenient board operation. The six function keys are:

| | |
|---|---|
| Enter | 210 |
| Game (Next Game) | 212 |
| Recall (Correct) | 214 |
| Go To/Shift | 216 |
| Part (Next Part) | 218 |
| Card (Instant) | 220 |

The parenthetical functions of the keys 212, 214, 218 and 220 are reached through the sequence of first pressing the Go To/Shift key 216 and then the desired operation. Normal function is obtained for each key 212, 214, 218, and 220 by direct operation.

The four sections of the gaming card including the display 202, annunciator bar 204, numeric key pad 206 and function keys 208 provide for the playing of a complex gaming schedule without the player's enduring a long familiarization process. A player can easily execute or play a substantial bingo schedule comprising up to 16 independent games with up to four levels or four places per game. For each of the independent games, a player may play up to 40 cards automatically with ease and without any worry that a winning bingo may not be noticed.

Each game, level or place may contain an arbitrary win pattern which is automatically recognized from the stored gaming schedule. For example, to win the first level of a bingo game, a player might be required to achieve a win pattern consisting of all four corners on a card. The second level might require a player to achieve a win pattern comprising a large square, wherein the entire "B" column, the entire "O" column, the uppermost row, and the lowest row must all be marked. A third level could then require that the entire card be marked. Within each of these game levels, various place options are provided. For example, at the first game level, the first person to match the required win pattern would win first place. The second person to match the same pattern would win second place, and so on. First and second prizes could also be awarded at the second and third levels of the game.

Each electronic gaming board 12 is always in one of two mutually exclusive modes. It is in a communications mode when connected by a cable 30 to either the system base station 10 or a validation unit 14: or it is in a play mode at all other times, as during a gaming session. The communications mode interrupts the play mode at any time by connection of the gaming board 12 to one of the external units.

Figure 7:
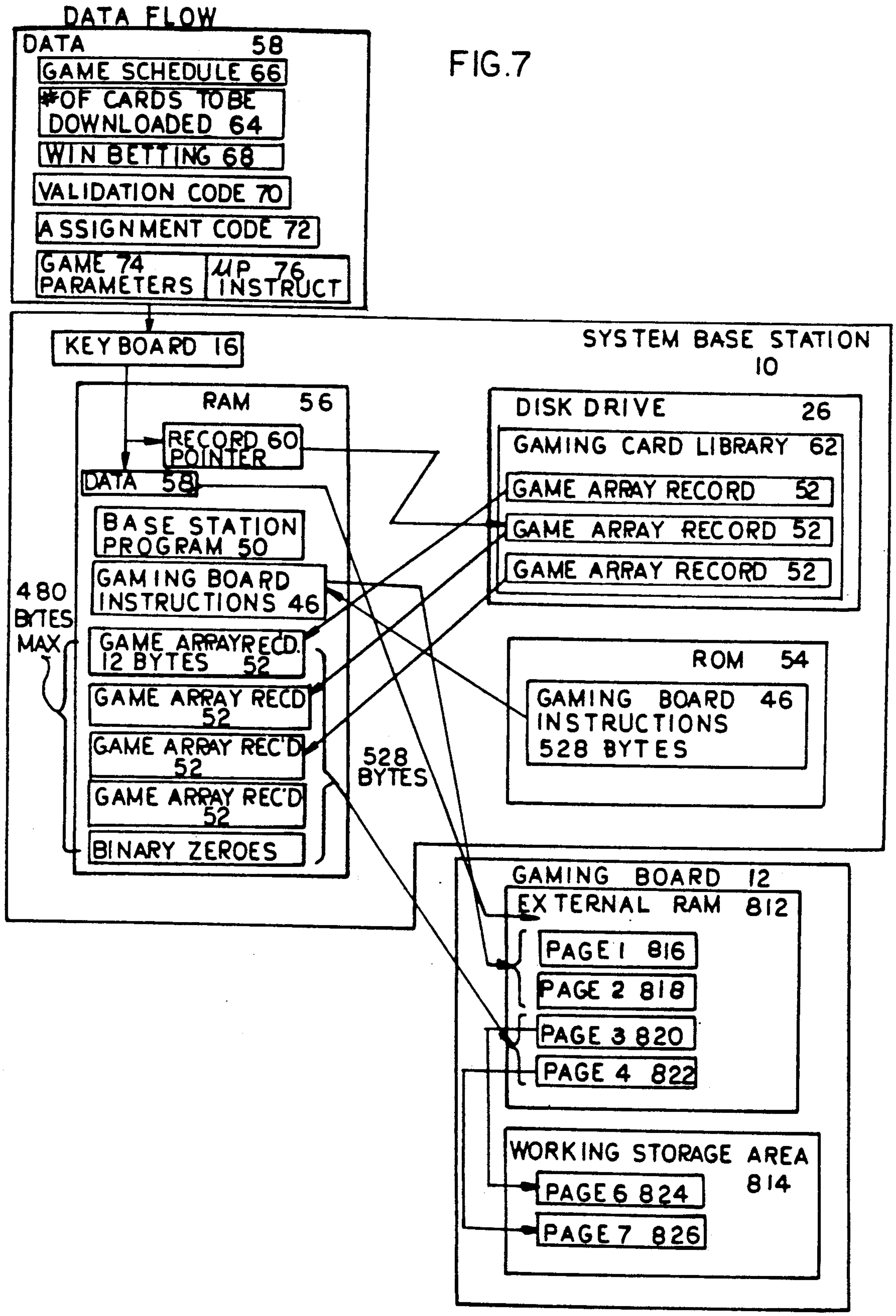
FIG. 7 is a block diagram which illustrates data transfer between the user, the system base station RAM shown in FIG. 3, the system base station ROM shown in FIG. 3, the system base station dual disk drive shown in FIG. 3, and the gaming board external RAM shown in FIG. 5.

With reference to FIG. 7, in the communications mode, a gaming board 12 receives game information, such as a gaming schedule, microprocessor instructions, and one or more bingo card arrays 52. Bingo card arrays for up to 40 games are provided in a string of 1025 bytes which is initially sent, byte-by-byte, to a temporary storage area within the external RAM 812 of the gaming board 12. Once the string is loaded into external RAM 812, the gaming board 12 is automatically set to the play mode upon disconnection of the cable 30 (FIG. 1).

During the play of a bingo game, the caller selects and calls out random numbers. In response, each player enters the two-digit number on the key pad 206 (FIG. 4) and then presses the Enter key 210. The gaming board 12 searches its working storage area 814 corresponding to all of the enabled game cards and marks each card entry that matches the number entered. On the bingo card array currently displayed, the corresponding square or space is blanked. For other card arrays stored, but not displayed, the match is similarly noted internally. If a particular win pattern for any card 52 stored in memory is completed by the match, then the gaming board 12 will signal a win indication by displaying the bingo annunciator and by playing an audible tune, simultaneously displaying the winning card.

The function keys 212, 214, 218 and 220 are used in combination with the annunciator bar 204 and center space of the display 202 to provide downloaded game schedule information to a player. For example, by pressing the Game key 212 the player will display the game annunciator and the number of the present game of the schedule in the center (free) space as long as the key is held down. Likewise, pressing the Part key 218 will display the level annunciator, and the level number for the present game will be displayed in the center space.

Pressing the Recall key 214 will cause the display to reverse itself, blanking out all numbers except those that have been marked or matched for the particular card being displayed. Those marked numbers are now displayed as they were originally, while all others in the array are blank. This allows a player to recall which numbers have been matched on a card. The recalled numbers are displayed along with the recall annunciator as long as the Recall key 214 is depressed. In a similar manner, pressing the Card key 220 displays the card annunciator, and the number of the present card is displayed in the center space. These two indicators are displayed for as long as the Card key is held.

The function keys 212, 214, 218 and 220 also relate to alternative functions which, in combination with the Go To/Shift key 216, provide special operations. Selection of the Go To/Shift key 216 displays the arrow annunciator and cautions the player that the next function key pressed, 212, 214, 218 or 220, will create a special operation. The Go To/Shift key 216 in combination with the Next Game key 212 causes the gaming board 12 to proceed to the next game in the sequence of the gaming schedule. The sequence of the Go To/Shift key 216 and the Next Part key 218 allows a player to move between levels or parts of an individual game. The Go To/Shift key 216 selected prior to the Instant key 220 allows the player to display different cards in the sequence of stored cards. The Instant key 220 pressed during the play mode has the function of changing the displayed card. If the key 220 is pressed prior to the play mode, it will produce an instant game function described more fully hereinafter.

Figure 5:
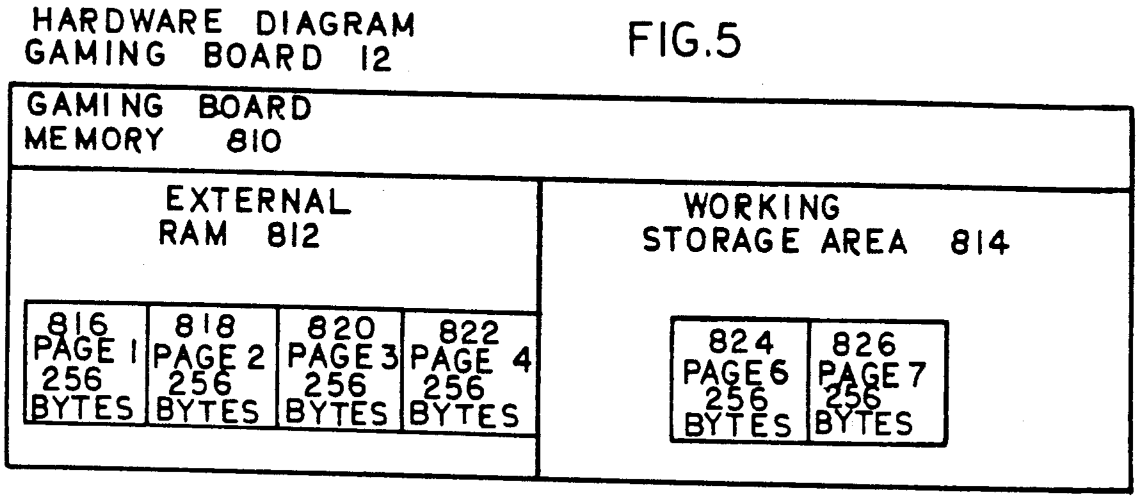
FIG. 5 is a block diagram depicting the organization of memory into external RAM and working storage areas for the gaming board illustrated in FIG. 1.

The organization of gaming board memory 810 is depicted in FIG. 5. Memory 810 is divided into External RAM 812 and the Working Storage Area 814. External RAM 812 includes pages one through four, 816, 818, 820, and 822. The Working Storage Area includes pages 6 and 7, 824 and 826. Each individual page contains 256 bytes. Pages 1 and 2, 816 and 818, will store gaming board instructions which are downloaded from the system base station. Pages 3 and 4, 820 and 822, will temporarily store the individual game card arrays 52 downloaded from the game card array library 62, until these individual game card arrays are transferred to Pages 6 and 7, 824 and 826, of the Working Storage Area 814.

In general, each electronic gaming card 12 is connected through the cradle 24 to the system base station 10 during the communications mode. In the communications mode, the game schedule 66 is downloaded into gaming board memory 810. Next, the base station program 50, which includes at least one gaming card 52 in addition to the gaming board instructions 46, is downloaded from the system base station RAM 54 into the External RAM 812 of the individual gaming boards 12.

Figure 6A:
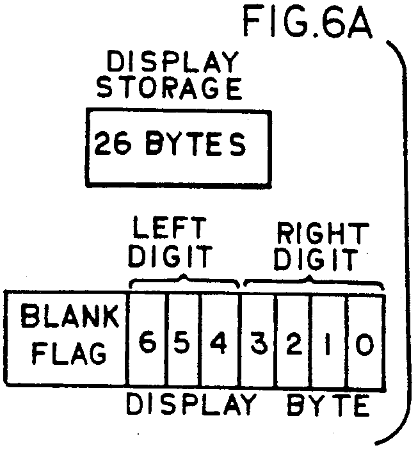
FIGS. 6A, 6B, 6C, and 6D are diagrammatic representations of storage areas used for various operations of the electronic gaming board illustrated in FIG. 1.

FIGS. 6A, 6B, 6C and 6D illustrate a number of storage areas in the memory of the gaming board 12 which assist with the functions previously described. FIG. 6A illustrates that an area of memory termed display storage contains 26 bytes. This storage area represents the 25 spaces of the display array 202 and the annunciator bar 204, shown in FIG. 4. Each display byte which corresponds to a space contains the two digits of that display space in the first 7 bits and a blank flag in bit 8. As matches take place, the flag bits are set so that when the particular card which is stored in the display storage is shown, the numbers which have been called are blanked. By contrast, when a recall function is requested, the spaces which are not flagged are blanked by the display.

Figure 6B:
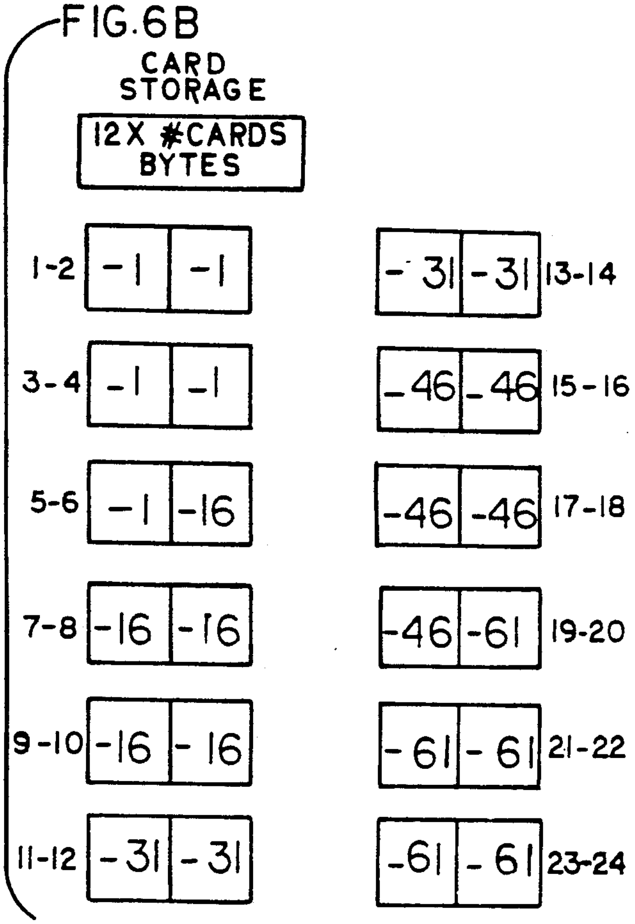

With reference to FIG. 5, there is a storage area termed card storage, located in the Working Storage Area 814, which stores the numbers for all of the individual game card arrays 52 purchased and downloaded from the system base station 10. The card storage is illustrated in FIG. 6B, and comprises 480 bytes (12 bytes ×40 cards). If fewer than 40 cards are played, the remaining bytes are valued at binary zero. Each number for a space selected in a card is stored in one nibble of a byte. An entire card of 24 numbers is downloaded and stored in 12 bytes by a reduction algorithm which reduces each number to four bits in length. All numbers of a particular column of a bingo card can have one of fifteen values. The position of the column determines an offset which can be added to the numbers 1-15 which will yield all fifteen values. The binary equivalent for 1-15 can be stored in 4 bits. Therefore, once a card is loaded in the display storage, it is reduced to twelve bytes by subtracting a column-dependent offset from each number prior to its storage in card memory. The reverse is true when the card array is to be displayed, such that a position-dependent offset is added to each number when loading the display storage from the card memory. As shown in FIG. 6B, the offset is 1 for the first column, 16 for the second, 31 for the third, 46 for the fourth, and 61 for the fifth. The numbers shown in the boxes are subtracted from the bingo numbers to give 4-bit numbers suitable for storage.

Figure 6C:
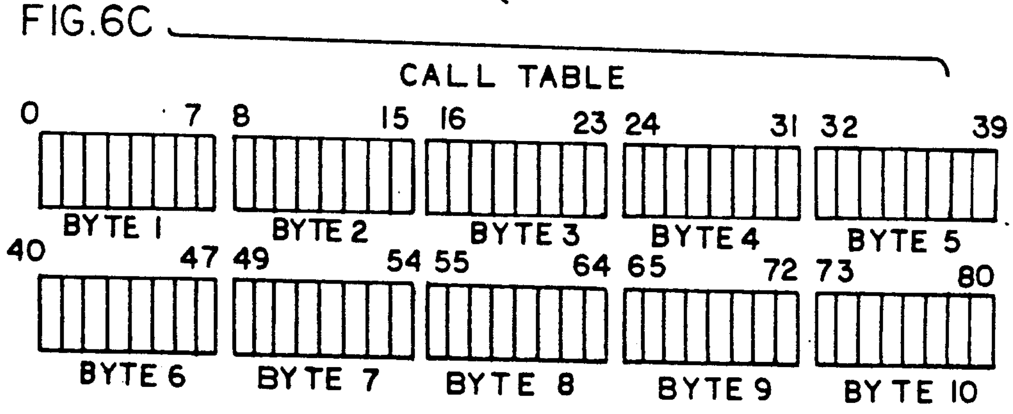

As play progresses and the player enters numbers into the gaming board 12, these numbers must be remembered to determine duplicate entries, and for validation purposes. The gaming board 12 stores the called numbers in an area termed the call table 53, which is illustrated in FIG. 6C. The numbers are stored in a plurality of sequential bytes having at least one bit for each possible number. In the illustrated example, 75 bits are arranged in 10 bytes of RAM where bit 0 in the first byte is not used, bit 1 of the first byte represents the numeral 1, bit 2 in the first byte represents the numeral 2, bit 3 in the first byte represents the numeral 3, and so on. Then, bit 0 in byte 2 represents the numeral 8, and so on.

Figure 6D:
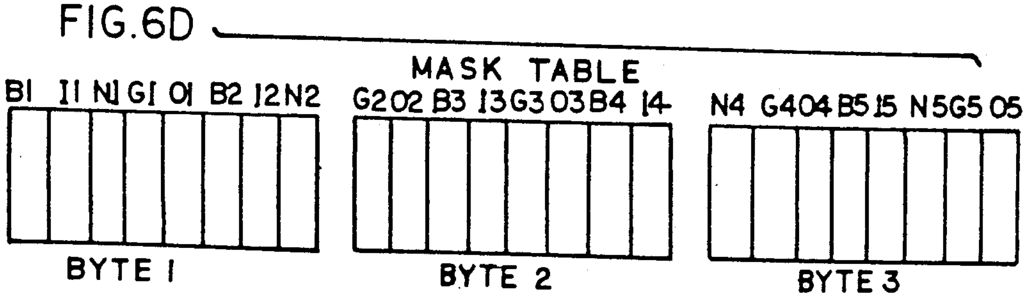

For each card array, the pattern of spaces on the display can be represented, as discussed previously, by 24 bytes, one for each space except the free space. A mask for each enabled card representing the numbers called is stored in an area termed the mask table 51 as illustrated in FIG. 6D. Bit 0 of the first byte of a mask represents space B1 of a card; bit 1, space I1; bit 2, space N1, etc.

Each time a number is entered into the gaming board 12 during the play mode, the board searches all enabled cards to determine if there is a winning bingo. The mask for each card is checked against all win patterns in the current format, as indicated by the schedule determining the game and level being played. If the display mask contains all the blank positions indicated by one of the win patterns, it is a potential bingo. If not, the search proceeds to the next card until all cards have been checked against all patterns in the current format. When the search is complete, the card which was displayed when the call was entered is redisplayed, and the board waits for another entry.

FIG. 7 illustrates the transfers of data which take place when individual game card arrays are to be downloaded from the system base station 10 into the gaming boards 12. The user enters game data 58 into the keyboard 16. This game data 58 includes the number of game cards, from 1 to 40, to be downloaded 64; the game schedule 66, which consists of a plurality of win patterns 68 and the order in which these win patterns are to be played; a validation code 70 specific to a particular gaming session, and an assignment code 72 specific to one individual gaming board 12. The game data 58 is transferred from the keyboard 16 to the system base station RAM 56. The base station CPU 22 refers to the number of cards to be downloaded 64 when updating the value of a record pointer 60 stored within the base station RAM 56. The record pointer 60 points to an individual game array record 52 located within the game card array library 62.

The individual game array records 52 are stored in a random-access file comprising a game card array library 62, on the dual floppy disk drive 26 of the system base station 10. Each individual game card array 52 is stored as a single record in the file with the record number used as the serial, or library, number of the card face. For instance, library card number 1079 means that its card array data is the 1079th record in the game card array library 62.

Although a bingo card contains 24 two-digit numbers ranging from 1 to 75 (or 1 to 90), it is possible to pack an individual bingo card array 52 into only 12 bytes, or two hexadecimal digits. This packing operation is accomplished by recognizing that each column of a bingo card consists only of the possible numbers 1 to 15 plus a constant offset. Thus, the "B" column will only have numbers 1 through 15; the "I" column will only have numbers 16 through 30, or numbers 1 to 15 if a constant offset of 15 is added; the "N" column will only have numbers 31 through 45, or numbers 1 through 15 if a constant offset of 30 is added; the "G" column will only have numbers 46 through 60, or numbers 1 through 15 if a constant offset of 45 is added; and, finally, the "O" column will only have numbers 61 through 75, or numbers 1 through 15 if a constant offset of 60 is added. Thus, by organizing the numbers into columns and subtracting the appropriate offset for each column, all the numbers on a bingo card can be reduced to a number between 1 and 15 and thus represented as a hexadecimal digit. Since each byte holds two hexadecimal digits, an entire game card array can be stored in 12 bytes.

In this manner, approximately 50,000 individual game card array records 52 can be stored in a file, or a game card array library 62, containing 50,000 records, each 12 bytes long. The game card array library will be 12 bytes times 50,000 records long, for a total of 600,000 bytes. Therefore, the game card array library 62 will easily fit on a hard disk drive. Alternatively, the game card array library 62 will fit on two floppy disks as two files of 300,000 bytes each. However, if floppy disks are used, the library card numbers for game card array records 52 beyond the first file, or disk, must be adjusted by the number of cards on the first disk to give the proper record number for that card face on the second disk.

When a game card array 52 is to be displayed on the game board 12, the game card array 52 must be unpacked. Unpacking is merely the reverse of the packing operation. Each hexadecimal digit is converted to decimal and the offset appropriate to the column of the number is added, thus restoring the original bingo card numbers.

The procedure of downloading individual game card arrays 52 from the game card array library 62 into the gaming boards 12 commences when the system base station operator enters the appropriate command into the keyboard 16. The system base station CPU 22 responds by forming a base station program 50 in the base station RAM 56. The base station program 50 is a sequence, or string, of bytes that is 1024 bytes long. The first 528 bytes are reserved for the gaming board instructions 46, which are retrieved from the system base station ROM 54, the system base station RAM 56, or the disk drive 26. The gaming board instructions order the gaming board 12 to move the game card array records 52 from Pages 3 and 4, 820 and 822, of External RAM 812 to Pages 6 and 7, 824 and 826, of the Working Storage Area 814. If the gaming board instructions 46 do not require the full 528 bytes allocated, the remaining bytes are filled with binary zeroes.

The system base station CPU 22 next loads the individual game card arrays 52 into the base station program 50. The base station CPU 22 refers to the number of cards to be downloaded 64, as entered by the user, to update the value of the record pointer 60 stored within the base station RAM 56. The record pointer 60 points to an individual game array record 52 located within the game card array library 62. Knowing the starting library card number from the initial value of the record pointer 60, and knowing the number of cards 64 to be downloaded from the game card array library 62, the base station CPU 22 sequentially reads the 12-byte game array records 52 from the game card array library 62. The base station CPU 22 then adds these game array records 52 to the base station program starting at the 529th location. Since up to 40 game array records may be downloaded into each gaming board 12, then up to 40 times 12 bytes, or 480 bytes, can be transferred into the base station program 50. From the end of the card data, the base station program 50 is completed to 1024 bytes by filling in the remaining bytes with binary zeroes.

Note that the packed representations of the game card arrays are stored in the base station program 50, and the library card numbers of the individual game card arrays 52 are sequential. Furthermore, the initial value of the record pointer 60 is stored in the base station RAM 56. Since the initial value of the record pointer 60 contains the starting library card number, and the individual game card arrays 52 are downloaded sequentially, each individual game card array 52 may be positively identified.

Once the base station program 50 is assembled in the base station RAM 54, an ASCII character, "3", is added to the front of the 1024-byte string. This character instructs the gaming board 12 that a base station program 50 is to follow, and that the program should be loaded into External RAM 812, starting at Page 1 (818) and ending at Page 4 (824), each page being 256 bytes long.

Next, the base station CPU 22 sends an interrupt signal to the gaming board 12. This interrupt signal causes the gaming board 12 to stop whatever it is doing and enter the communications mode. The base station program 50 is then transmitted from the system base station 10 to the gaming board 12 based upon the RS-232 serial communications standard. A transmission rate of 4800 baud is used, with the appropriate start and stop bits around each character. As the gaming board 12 receives each byte, it adds the byte to a running checksum. After a complete 1024-byte base station program 50 has been received, the gaming board 12 sends the checksum to the base station 10. The base station CPU 22 compares the checksum received from the gaming board 12 against a checksum the CPU 22 calculated to see if the transmission was successful.

The system base station 10 also downloads the validation code 70, game parameters 74, and optional microprocessor instructions 76 for execution. While downloading, the system base station CPU 22 notes and records in RAM 54 the game card library numbers of those game cards 52 which have been distributed to the gaming boards 12.

The validation code 70 is a unique number corresponding to one specific gaming session. This code ensures that the dishonest player will not win on a game card purchased for use in another game session or at another game location.

Once the communications are completed, the gaming board 12 microprocessor returns to the point in its control program where it left off before receiving the interrupt from the system base station 10. One of the periodic operations in the gaming board 12 control program is to call the subroutine on the first page of External RAM 816. Normally, there is only a "RETURN" command at this location which sends the gaming board 12 microprocessor back to the control program. But after the aforementioned downloading procedure, the gaming board instructions 46 are at this location and will be executed periodically, every time the subroutine call is made. To avoid repeated executions, these instructions contain a final command. Once the instructions have been executed for the first time, the final command orders the gaming board 12 microprocessor to place a "RETURN" instruction at the beginning of Page 1. Thus, the gaming board instructions 46 will be executed only once for each downloading operation.

Note that the individual game card arrays 52 are stored in the Working Storage Area 814 of the gaming board memory 810 in packed form. The individual game card arrays 52 are unpacked only when the gaming board 12 copies an individual game card array 52 to the display RAM area.

The process of downloading the bingo card arrays 44 into external RAM 812 before moving the information into the working storage area 814 can be replaced by a more efficient process which directly loads the bingo card arrays 44 into the working storage area 814. This more efficient process could be implemented by changing the program code of the gaming board 12. However, the program code was fixed into the gaming boards 12 before the present downloading procedure was conceived. The fixed program code of the gaming board 12 expects to find the bingo card arrays 44 stored within the working storage area 814, not the external RAM 812, thus mandating a two-step downloading procedure.

When the ROM program code of the gaming board microprocessor 300 is changed, it will be possible to have the bingo card arrays 44 sent directly to the working storage area 814 as the base station program 50 is received. This would eliminate the need for downloading the gaming board instructions 46. Furthermore, the bingo card arrays 44 would no longer need to be stored temporarily in the external RAM 812.

After this expeditious downloading procedure, the gaming board 12 enters the play mode where the random numbers called by the operator are matched against numbers in the respective bingo card arrays 44. As the numbers of a particular game are called, the player enters those numbers into his electronic gaming board 12 to determine if they match any of the numbers on one of the bingo cards 52 contained therein. A particular game in the session is played until one of more of the electronic gaming boards 12 signals, audibly and by a visual indicator, that the game has been won. A payout is made using the validation units 14 and play is resumed until an entire gaming schedule is completed.

The validation units 14 are initialized by connection to the cradle 24 of the system base station 10 and receive an assignment code and the validation code for the particular gaming session. When a player scores a bingo, or other type of winning combination, the validation units 14 are used to verify that the win was legitimate. At the same time, information specific to a win is recorded within the validation unit 14 and later these stored data records, along with a validation unit identification code, are uploaded to the system base station 12 via the cradle 24.

Figure 8A:
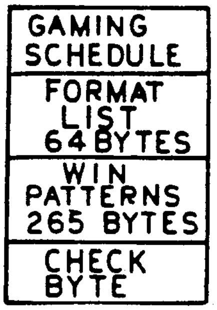
FIGS. 8A, 8B, 8C, 8D, 8E, 8F, and 8G are diagrammatic representations of the data packages which are transferred between an electronic gaming board and the system base station or validation unit shown in FIG. 3.
Figure 8B:
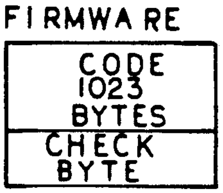

The system base station 10 can download four different types of data blocks through the communications interface to a respective gaming board 12 as illustrated in FIGS. 8A, 8B, 8C and 8G. A gaming schedule as shown in FIG. 8A preferably includes 64 bytes of format list, 256 bytes of win patterns, and a check byte. The second type of block comprises 1023 bytes of special microprocessor instructions followed by a check byte. The block of special microprocessor instructions are executable by the gaming board 12 upon a special sequence of key actuations or commands. The instructions are used for special security applications or other functions.

Figure 8C:
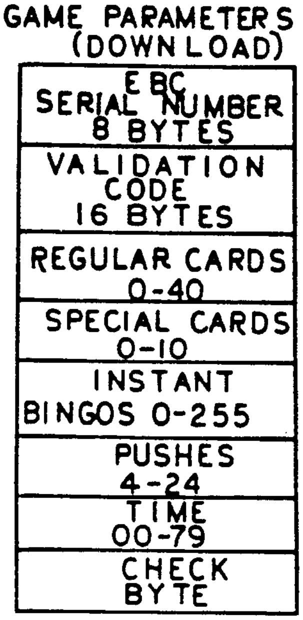

A game parameters block is shown in FIG. 8C. The system base station 10 assigns each gaming board 12 an 8-byte serial number defining the board and the player who will use the board during a particular gaming session. The serial number is used for auditing purposes to track the cards in play and comprises the first 8 bytes of the game parameters. The next 16 bytes of the game parameters contain a validation code which is identically input to every gaming board 12 and validation unit 14 to define a gaming session. Next in the game parameter block is a byte indicating how many regular cards, up to 40, the player has purchased. The following byte is the number of special cards, up to 10, purchased. Thereafter, another byte indicates the number of instant bingo games purchased, up to 225. The next to the last byte of information in the block indicates the number of chances available to select instant bingo spaces. The final byte is a check byte.

Figure 8D:
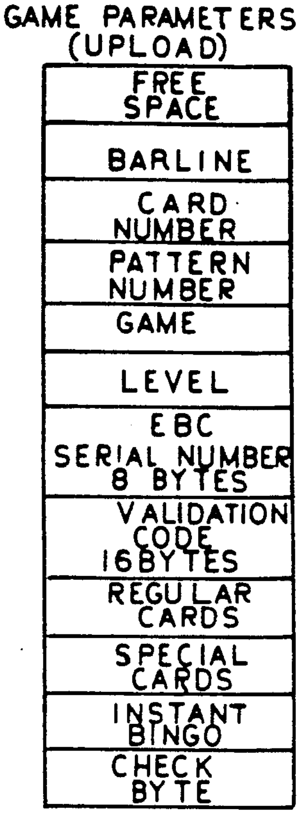
Figure 8E:
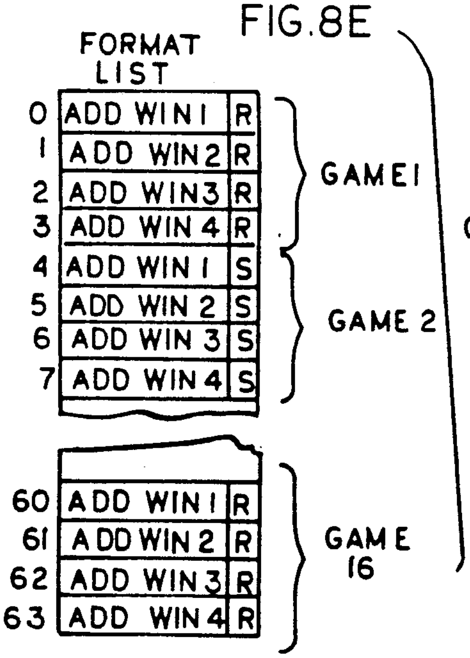
Figure 8F:
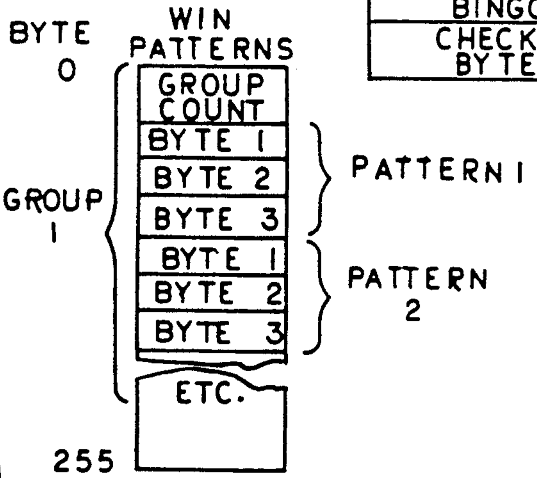
Figure 8G:
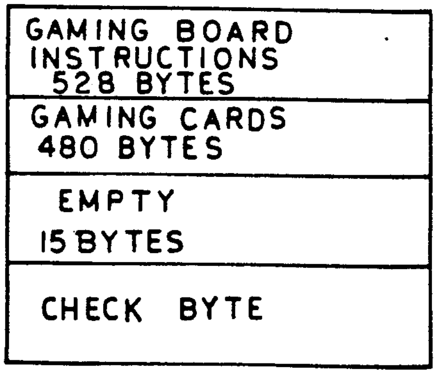

The fourth block of data which can be downloaded is the system base station program 50 shown in FIG. 8G. The program 50 consists of an ASCII 3 followed by a string of 1024 bytes. The first 528 bytes contain gaming board instructions 46 which are used by the gaming board 12 to move data from temporary storage in External RAM 812 to the Working Storage Area 814. The next 480 bytes are devoted to individual game card array 52 storage. As each individual game card array 52 is represented with 12 bytes, 480 bytes allows for for 40 game card arrays. The string is completed to 1023 bytes with binary zeroes, and the final byte is reserved as a check byte.

Through the communications interface cable 30, a validation unit 14 can upload a block of data as illustrated in FIG. 8D from a gaming board 12. These game records, or parameters, are downloaded from the system base station 10 into the gaming board 12 and are available upon command from the validation unit 14. The first six bytes of this block constitute the values of the status indicators for a gaming card at the time of a win or, alternatively, represent a validation command. The contents of the free space, including the card number, the annunciator bar, more fully described herein, and the pattern, game and level of the gaming schedule are uploaded. The next 27 bytes are copies of the initialization information downloaded previously, including the serial number, validation code, and number of regular, special and instant bingo cards. The block ends with a check byte.

A flexible and complex gaming schedule can be formed by the system base station 10 and downloaded into each gaming board 12. FIGS. 8A, 8E and 8F illustrate a schedule for a typical 16-game session with up to 4 sublevels or places for each game. The schedule is separated into a format list and a plurality of win patterns. The 16 games of the session are each assigned four bytes which contain addresses of win pattern groups in the win patterns. Therefore, each game area of the format list points to the winning pattern for that particular game.

For different level games the addresses of the win pattern groups can be different, each building into a more complex pattern. For different place games, the addresses of the win pattern groups can be repeated. In addition, combinations of place and level games may be played in this manner. For example, a two-level game with a first and second place for each level can be played by storing the same win group addresses in the first and second bytes of a game and another win group address in the third and fourth bytes. It is evident that a 16-game, 4-level place schedule is a completely arbitrary choice, and other schedules of this type can be used.

Each win pattern group comprises a group count byte and a plurality of 3-byte (24 bits) win patterns. Each bit of a win pattern is assigned to one of the 24 spaces of the 5×5 bingo array (the free space is excluded), and a pattern is formed by selecting the spaces which must be matched for a win. The selected spaces are marked (one or zero) and the remaining bits are filled with the other logic value. The count number identifies the number of ways or patterns that will result in a win. For example, regular bingo has 12 win patterns (5 rows, 5 columns, 2 diagonals).

Figure 11:
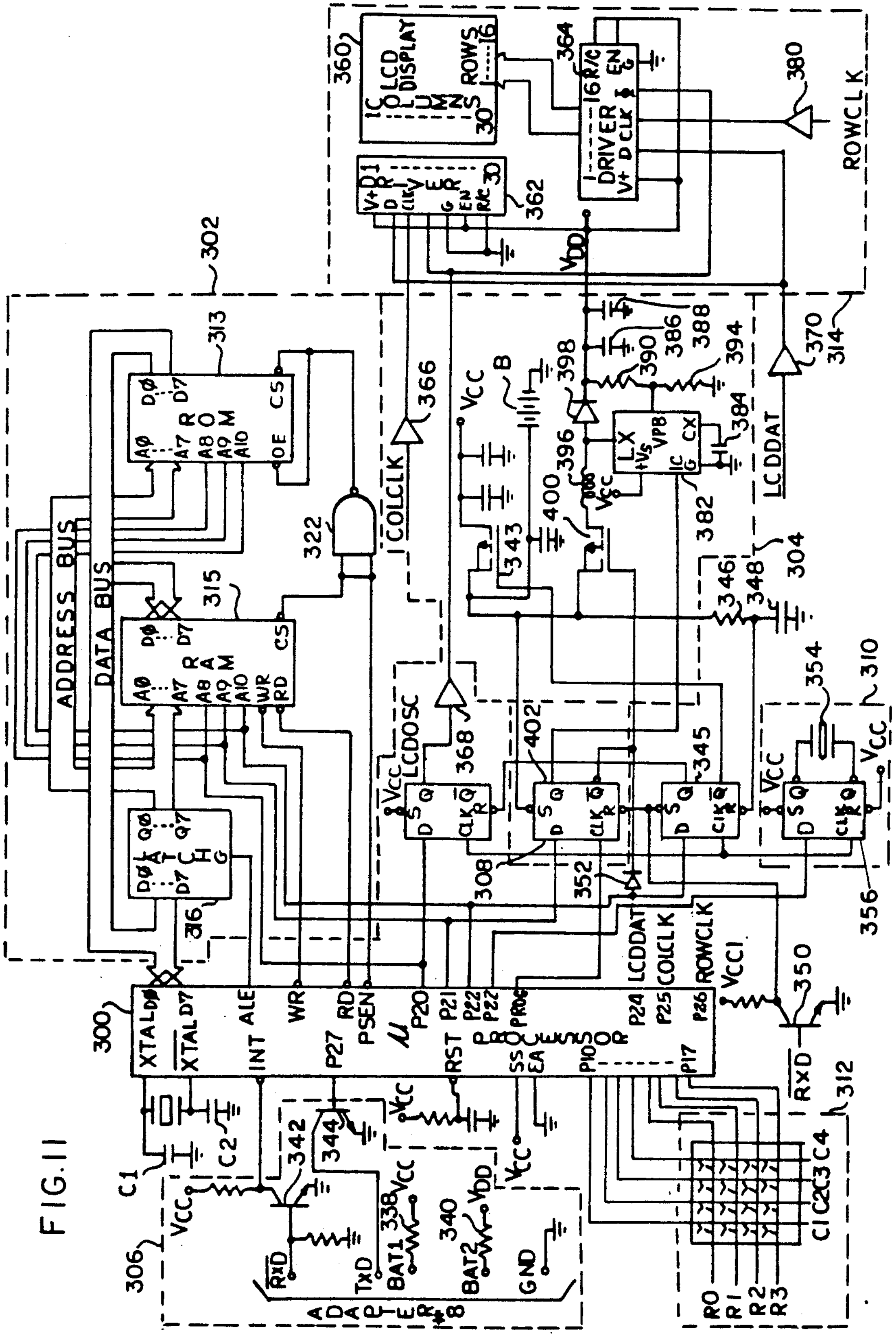
FIG. 11 is an electrical schematic diagram of the circuitry comprising the electronic gaming board illustrated in FIG. 4.

FIG. 11 illustrates a detailed electronic schematic of a gaming board 12 which generally comprises a microprocessor 300, a memory and memory control circuit 302, a power supply 304, a communication interface 306, a power bistable 308, an audio annunciator 310, a keyboard 312, and display and display driver units 314.

The microprocessor 300 is a standard, single-chip microcomputer having a bidirectional data/address bus D0–D7, bidirectional input and output ports P10–P17, P20–P27, and I/O control lines WR, RD, PSEN, and PROG. Further, the microprocessor 300 has pins for handling interrupts INT and resets RST. While the microprocessor 300 could be any of a number of single-chip microcomputers, preferably the device is an 80C49 microprocessor manufactured by the Intel Corporation of Santa Clara, Calif. The pin designations shown will pertain to that device and are more fully described in the operating manual for the Intel 80C49. A single-chip microcomputer of this type includes a central processing unit, 128 bytes of random-access memory (RAM) and 16 8-bit registers R0–R15 Further included are provisions for an 8-word by 16-bit memory stack, 96 bytes of general-purpose RAM and, as an option, 2 kilobytes of read-only memory (ROM).

Communications for the microprocessor 300 with peripheral devices are carried out through the 8-bit data/address bus D0–D7, and the I/O control lines. A 6-MHz crystal Y1, connected between terminals XTAL and *XTAL of microprocessor 300, serves as a frequency reference for an oscillator circuit located within the microprocessor 300. Each terminal of the crystal Y1 is further connected to a capacitor, one crystal terminal connecting to C1, and the other crystal terminal connecting to C2. The remaining terminals of capacitors C1 and C2 are grounded. The external access pin EA and the single step pin SS for the microprocessor 300 are not used and, therefore, are tied to ground and a high logic level Vcc, respectively.

Normally, a read-only memory 313 of the memory and memory control circuit 302 will contain the control program for the microprocessor 300. Instructions are transferred from the ROM 313 via its data output pins D0–D7 which are connected to the data bus and thereafter to the data ports D0–D7 of the microprocessor 300. The ROM 313 is accessed through the address bus and address lines A8, A9, and A10. An address byte from the data port pins D0–D7 is strobed into an address latch 316 with an alternate logic enable signal ALE. The data bus and the address bus are similarly utilized for the random-access memory 315. At the beginning of each memory cycle, the microprocessor 300 places the lowest 8 bits of a memory address on the data bus and then strobes them into the latch 316 with the ALE Signal. The high address bits A8–A10 are set by selection of logic levels on port pins P20–P22. For the remainder of the cycle, the data bus carries data from the RAM 315 or the ROM 313 to the microprocessor 300 or from the microprocessor 300 to the RAM 315.

Control for the direction of data flow, and the memory that data are taken from or written into, is controlled by the write control line WR, read control line RD, and the program sequence pin PSEN. These signals are connected with the control inputs of the random-access memory 315 and the read-only memory 313 via three memory control logic gates 318, 320 and 322 which have their outputs connected, respectively, to the read and chip select inputs RD, CS of the random-access memory 315, and to the output enable and chip select inputs OE, CS of the ROM 313. The write control line WR of the microprocessor 300 is also directly connected to the write input WR of the random access memory 315.

When the microprocessor 300 requests instructions or data from an external memory, it prepares the address bus, as described above, and pulls the signals PSEN, RD or WR, and PROG depending upon whether a read or write operation is to take place. Depending upon the state of the PSEN line, either RAM or ROM will be accessed. NAND gate 322 assures that RAM and ROM will never be accessed simultaneously.

With reference to FIGS. 1 and 11, the gaming board 12 communicates with two devices external to itself, namely the system base station 10 and the validation unit 14 through the communications interface 306 and the cable 30. The communication interface 306 is designed to consume an absolute minimum of power, particularly when idle, and to be reasonably fast. The communications interface 306 uses an asynchronous communications protocol with the addition of a special handshaking routine to establish communications. The general communications protocol is byte-serial communications with one start bit, eight data bits (no parity), and one stop bit at a data rate of 4800 baud. Serial data are transmitted via the transmit line Txd and received via the receive line Rxd.

When the gaming board 12 is connected to either the system base station 10 or the validation unit 14, the board acts as a slave unit and waits for the other device to initiate communications. The gaming board 12 uses the BAT1 signal generated through resistor 338 to signal the validation unit 14 of a connection with a high logic level. The gaming board 12 uses the BAT1 and BAT2 signals generated through resistors 338 and 340, respectively, to test for low battery voltage with the system base station 10 and the validation unit 14.

When the validation unit 14 or the system base station 10, as the case may be, detects the high logic level, it will establish a communications link with the gaming board 12. The link is achieved by the master device beginning the communications by placing a zero (break) signal 500 or 520 on the Rxd line of the gaming board 12, as shown in FIGS. 9 and 10, respectively. With reference to FIG. 11, this break signal produces an interrupt to the microprocessor 300 by causing a transistor 342 to conduct. The gaming board 12 will then reply with a low-level response at 502 or 516 by applying a high logic level to the base of a transistor 344 through pin P27, thus grounding the Txd line through the transistor 344. The master unit will again respond by setting the Rxd output high at 504 or 520, removing the interrupt from the INT pin of the microprocessor 300. Thereafter, the microprocessor 300 will again reply at 506 or 517 by bringing the Txd line to a high logic level by turning off the transistor 344 with pin P27. Once the handshake has been accomplished, the link is established and data communications may take place.

The system base station 10 or the validation unit 14 will then transmit a one-byte command 522, 508, as shown in FIGS. 9 and 10, respectively, to the gaming board 12, requesting a particular operation. Depending upon which device it is communicating with, the gaming board 12 will perform either a download operation as illustrated in FIG. 9 or an upload operation as illustrated in FIG. 10.

The command byte is an ASCII numeral from the set [1, 2, 3, 4, 5, 6], specifying one of six commands as follows:

1 Download gaming schedule
2 Download game parameters
3 Download special instructions
4 Upload game parameters
5 Power down
6 Download game cards After receiving the command byte, the gaming board 12 executes one of the six commanded operations depending upon the value of the byte. If the command byte is a "1", "2", "3" or "6", the gaming board 12 prepares to receive (download) a block of data from the system base station 10. The downloaded data blocks have been discussed above in connection with FIGS. 8A, 8B, 8C and 8G. If the command byte is a "4", the gaming board 12 will transmit (upload) a block of data to the validation unit 14. The uploaded data block has been previously illustrated with respect to FIG. 8D. If the command byte is a "5", the gaming board 12 will power down and turn itself off. Any other command byte value is ignored. After these actions are completed, the gaming board 12 breaks the communications link, thereby requiring the link to be re-established for further communication to occur.

Following the data block transfers, whether data went to or from the gaming board 12, a checksum byte is transmitted back to the master unit. The checksum is the arithmetic sum of all the bytes transmitted after the command byte. For data transmitted from the gaming board 12, the validation unit 14 must match the gaming board checksum to the checksum the validation unit calculated while receiving the data. If they match, the transfer was good and, if not, the validation unit 14 is responsible for re-establishing the link and reissuing the upload command until a good transfer is achieved. For data transmitted to the gaming card 12, the checksum must equal zero for a good data transfer, as a check byte will be included in each block of data to make the checksum equal to zero if the transfer is valid. Again, if the checksum transmitted to the system base station 10 is not zero, then it is incumbent upon the base station to re-establish the link and reissue the communications until a good transfer is achieved.

The power supply circuitry 304 and the power supply bistable 308 will now be more fully described with respect to FIG. 11. The gaming board 12 has no on/off switch. The gaming board 12 is turned off under program control and is turned on by the system base station 10 during initial communications. The main power switch for the gaming card 12 is a P-channel MOSFET 343 connected between a battery B and a voltage terminal Vcc. When the gate of the MOSFET 343 has a low logic level applied to it, the device provides a low-impedance path from the battery B to the terminal Vcc. When the gate has a high logic level applied to it, the MOSFET turns off, thereby shutting down most of the circuitry within the gaming board 12 and conserving battery power.

The gate of the MOSFET 343 is controlled by the output *Q of a power bistable 345. The bistable 345 is powered by the battery B directly and, therefore, operates whether the MOSFET 343 is on or off. When battery power is first applied to the circuit by connecting the battery B, an RC network 346 and 348 applies a reset to the bistable 345 and clears the device. This turns the MOSFET 343 off and insures that the rest of the gaming board is off. When the gaming board is connected to the system base station 10 and current is sourced into pin RxD of the communications connector, a transistor 350 turns on and applies a set signal to the bistable 345. This operation turns the MOSFET 343 on and with it the gaming board circuitry. When the program-controlling microprocessor 300 determines to power down the gaming board 12, it simply writes a zero into the power control bistable 345 through pin P22. The Q output of the power control bistable 345 is further connected by a diode 352 to its D input. This is to ensure that the bistable 345 will not inadvertently become set during the period when the power supply voltage to the microprocessor 300 is falling.

The gaming board 12 uses an audio annunciator which emits audible tones to congratulate a player for scoring a win pattern. Audible tones are also used to inform the player that he has lost at instant bingo, and to provide feedback for key presses. The device used to generate sonic energy for these annunciations is a piezoelectric bender 354. The bender 354 is a high-efficiency, high-impedance, low power audio transducer which can be driven by two alternating logic levels. In the illustrated embodiment, it is driven by the complementary outputs of a D-type bistable 356. In this manner, the bender element 354 sees a signal with a magnitude of approximately twice the power supply voltage Vcc, or about 10 Vac. Because the driving signal is a square wave, a tone from the bender element 354 is rich in harmonics and quite distinctive. The microprocessor 300 under program control toggles the bistable 356 at various frequency rates to produce different desired tones.

The display 314 comprises a display chip 360, a column driver chip 362 and a row driver chip 364. The display chip 360 is a large liquid crystal display (LCD) having a multiplexed sixteen-row by thirty-column matrix. Of the resulting 480 logical display elements, only 358 are actually used. They are arranged in an array of five rows each having five positions, where there are two digits in each position for a total of 50 digits. Each digit is in turn composed of seven segments, for a total of 350 segments. The annunciator bar has eight separate segments for annunciator flags. The display elements are normally clear but turn dark when excited by a voltage of sufficient magnitude.

The LCD driver chips 362 and 364 require four signals from the microprocessor 300. The first is a master timing signal LCDOSC for the LCD drivers. The LCDOSC is generated for the output of pin P20 of the microprocessor 300 after division by a D bistable 367. A signal LCDDAT carries data bits which are shifted into the drivers indicating which of the elements are to be displayed and is connected to the D inputs of both driver chips 362 and 364. The LCDDAT signal is generated from the output of pin P24 of the microprocessor 300. A signal ROWCLK clocks the data bits into the row driver 364 on its falling edge and a signal COLCLK clocks the data into the column driver 362 on its falling edge. The signals ROWCLK and COLCLK are generated from pins P26, P25, respectively, of the microprocessor 300. Because the LCD drivers 362, 364 operate from a power supply that is about 10 V, it is necessary to shift these four logic signals from the microprocessor 300 up to a higher voltage level. This is done through respective voltage level shifters 366, 368, 370 and 380.

The LCD driver chips 362 and 364, and shifters 366–370 and 380, require a voltage supply $V_{DD}$ of about 10 V. The gaming board 12 is powered by a battery B which delivers about 4.5 volts when fresh and about 3.5 volts when nearing depletion. The 10 volts required to supply the driver chips 362 and 364 is generated by a step-up voltage regulator 382. An external capacitor 384 on the input CX serves as a timing element for an oscillator internal to the regulator 382. By pumping current into and out of the capacitor 384, a triangular waveform is produced with a 50% duty cycle. The output voltage of the regulator 382 developed on capacitors 386 and 388 is divided down by resistors 390 and 394 and fed back to input VPB where it is compared against an internally generated reference of 1.3 V. If the feedback voltage is less than the reference, then the output LX of regulator 382 is turned on for one half-cycle of the oscillator, thereby shorting that point to ground.

While the output LX is grounded, current ramps up through an inductor 396 causing energy to be stored in its magnetic field. When the oscillator switches to the other half-cycle, the output LX shuts off and no longer sinks current. However, current continues to flow through the inductor 396, causing the voltage at a rectifier 398 to increase until it becomes forward-biased. Current flows through the rectifier 398, charging the output filter capacitors 386 and 388 until the energy stored in the inductor 396 is expended. The output voltage of the regulator 382 is controlled to 1.3 V * ((R390+R394)/R394), which is designed to be about 10 V.

The regulator 382 can also be turned off by control of current to its input pin 1C. When current is removed from pin 1C, the regulator 382 shuts down, drawing almost no current. This prevents the regulator from stepping up the battery voltage, although a path still exists for current to flow from the battery B through the inductor 396 and the rectifier 398 to $V_{DD}$. To prevent unnecessary current drain when the display power supply is to be shut off, a MOSFET 400 is placed between the battery B and the inductor 396. When the gate of the MOSFET 400 is at a low logic level, the device is on, providing a low-impedance path for battery current to flow into the regulator circuit. When the gate of the MOSFET 400 is at a high logic level, the device shuts off, preventing current from flowing through the inductor 396 and the rectifier 398. A bistable 308 is used to turn the step-up regulator 382 on and off. The 1C input is connected to the Q output of the bistable 308; the gate of MOSFET 400 is connected to the *Q output of the bistable 308. The bistable 308 is set or reset by program control via the output pin P21 and the clock signal PROG. The bistable 308 is reset upon power on and whenever the gaming card 12 enters a power conservation mode.

The gaming board 12 has the sixteen membrane keyboard 312 (shown electrically in FIG. 11 and mechanically in FIG. 4) by which the player inputs numbers and functional commands. The sixteen keys of the keyboard correspond to the digits 0–9 and the six function keys described previously. The keyboard is a four-row by four-column key switch electrical matrix which shorts one row to one column when a single key is pressed. The rows and columns of the keyboard 312 are connected to port 1 pins P10–P17. The pins P10–P13 are for columns and the pins P14–P17 are for rows. To scan the keyboard for a key press, the row pins are pulled, one at a time, to a low logic level through pins P14–P17, and the column pins P10–P13, normally high, are checked by the microprocessor 300 for a low logic level. If only one row pin going low produces only one column pin low, then exactly one key has been pressed and that key is the one detected. Key debounce and edge detection are accomplished by the control program.

Figure 12:
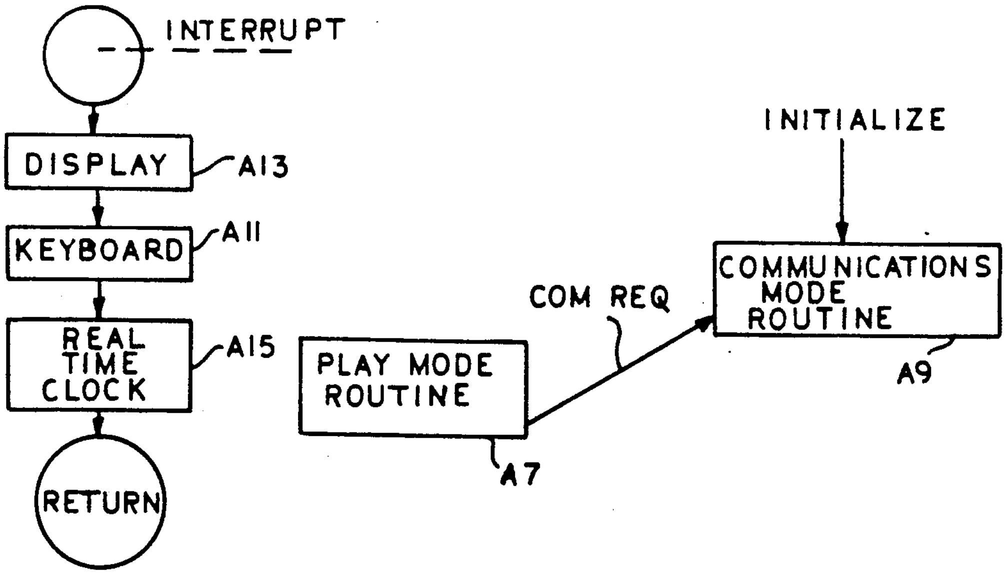
FIGS. 12A and 12B are a system flowchart of the control program which regulates the processes and signals of the microprocessor of the gaming board illustrated in FIG. 11.

FIG. 12A is a system flowchart of the programming for the control program stored in the gaming board 12 which operates to regulate the system. There are two main software portions of the control program, a communications mode routine illustrated as block A9 and a play mode routine illustrated as block A7. When the gaming board 12 is originally powered up by connection to the system base station 10, there is an initialization routine which is executed as part of the communications mode routine in block A9. If the gaming board 12 is not successfully programmed with a schedule of play, as well as game parameters and game cards, it will be powered down.

Once the gaming board 12 is successfully downloaded it enters the play mode routine in block A7. The play mode routine allows the player to display all the purchased cards, advance through the gaming schedule, score bingos, play instant bingo, and perform other functions provided by a function key. If a bingo is scored, whether regular or instant, a submode of the play mode routine is entered. A specific sequence of key presses is then required to return the gaming board to the regular play mode routine. This specific sequence is generally provided by the validator after communication with the validation unit 14.

At any time while the gaming board is in the play mode routine, the system base unit 10 or validation unit 14 can initiate communications with the gaming card 12 causing it to enter the communications mode routine. For example, if a bingo is scored, it must be validated, which requires communications with the validation unit 14. A return from the communications mode routine always places the gaming board 12 in the play mode routine.

As shown in FIG. 12B, the main software routine executes an interrupt routine which is entered on a real-time basis from an internally-generated timer interrupt. At every interrupt, or at a predetermined number of interrupts, the program will branch to the routine and execute a keyboard scan routine in block A11, a display handler routine in block A13, and a real-time clock routine in block A15. After these routines are executed, the program returns to the main program at the location from which control was interrupted.

Thus, these processes are transparent to the operation of the main part of the program and facilitate its execution. To display a symbol on the display all that is needed is for the main program to store the appropriate symbol in certain memory locations. To use the keyboard, the main program simply checks one memory location to see if the key is ready and another memory location to fetch the key when the key is present. Further, to test how much time remains in the load mode, the main program reads a memory location which contains the time remaining. The interrupt routine provides these functions in the interrupt mode, which permits the main program to execute the normal sequence.

The keyboard scan routine in block A11 checks the keyboard a number of times a second and determines whether there is a valid key press. If there is a valid key press, a decoding routine places a number in a memory location indicating which key is activated.

The display handler routine in block A13 generates the four special signals LCDOSC, LCDDAT, ROWCLK, and COLCLK necessary to maintain the display. Further, it reads a set of memory locations, and the display storage, to determine which symbols the display should show and converts that data to the LCDDAT signal.

The real-time clock routine in block A15 is used to count interrupts to determine the passage of real time. An activity counter in block A15 determines the time elapsed since the last key activation.

Figure 13:
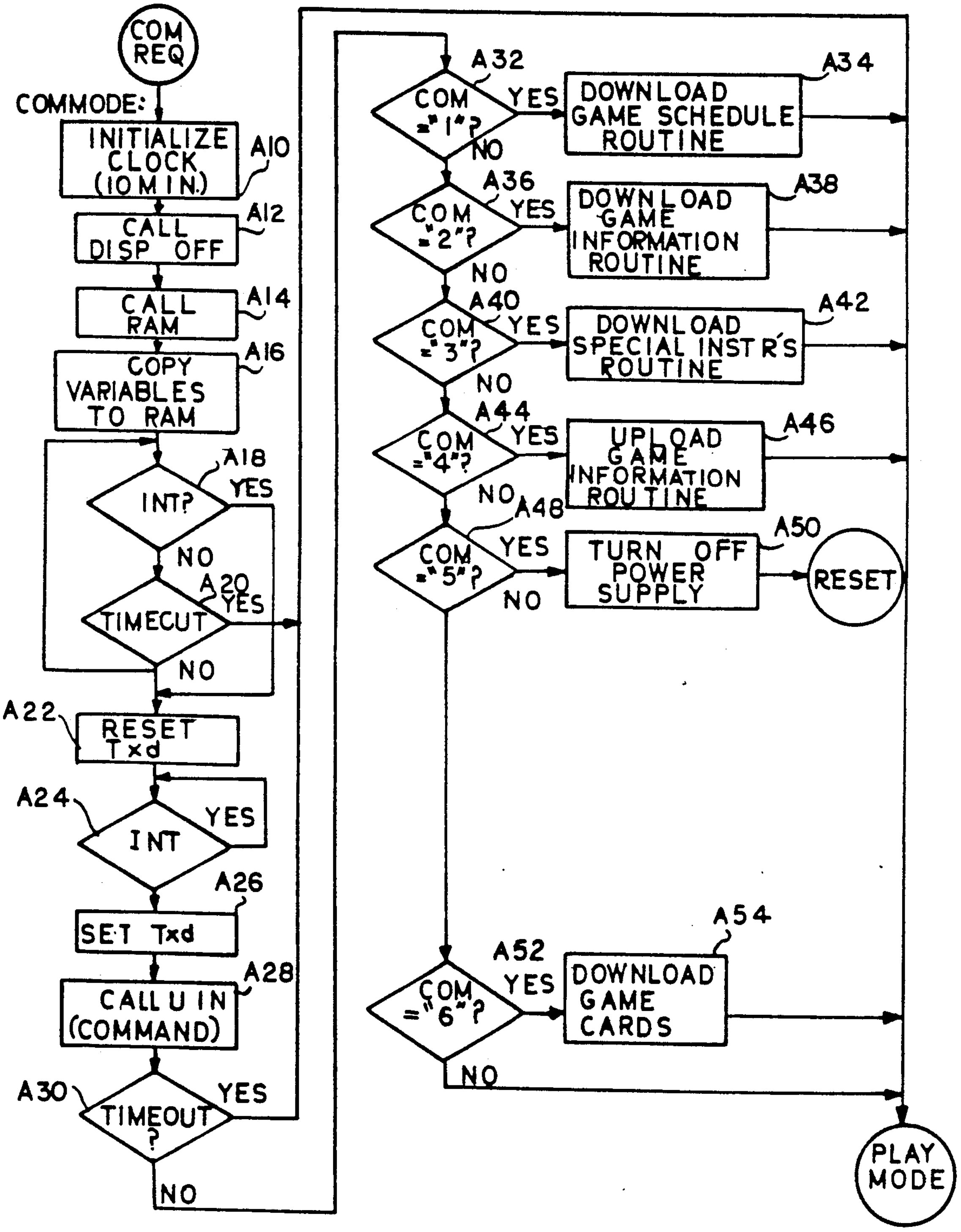
FIG. 13 is a more detailed flowchart of the control program illustrated in FIGS. 12A and 12B.

FIG. 13 is a detailed flowchart of the communications mode routine for the gaming board 12. The routine includes an initialization portion comprising blocks A10, A12, A14 and A16. In this initialization portion the activity counter is reset to ten minutes in block A10 and the display is turned off in block A12. Thereafter, the external RAM 812 is activated and initialized in block A11. In this manner, the RAM 812 may now copy blocks of data transmitted from the system base station 10. In block A18–A30 the communication linkage is developed to communicate with one of the external devices, such as a validation unit 14 or the system base station 10. Block A18 checks to see whether the gaming board 12 has received an interrupt from one of these external devices. If an interrupt is found, this indicates that an external device is requesting communications. Otherwise, the program loops through blocks A20 and A18 looking for either an interrupt or a time out. If the time out occurs first, then program control is transferred to the play mode.

However, if an external device is attempting to communicate, then in block A22 the gaming board 12 will set its transmit line Txd to 0 to respond to the interrupt. The program thereafter loops in block A24, waiting for the interrupt on the Rxd line to end. The disablement of the interrupt indicates that the external device has raised the Rxd line back to a logical 1, responding to the low logic level on the transmit line. Thus, the gaming board 12 will again reply in block A26, establishing the link by setting the transmit line Txd to a high logic level.

Next, in block A28 a subroutine UIN is called to input a command byte. If the command is received without a time out, then the program begins decoding it in blocks A32–A48. However, if the command is not received or there is an error in the communication, the program transfers to the play mode. Depending upon the command value, as tested in blocks A32, A36, A40, A44, A48 and A52, the gaming board 12 either downloads a block of information, such as the game schedule routine in block A34, the game information routine in block A38, or the special instructions routine in block A42, uploads a block of game information as in block A46, downloads gaming cards as in block A54, or turns off its power supply as in block A50.

If the command is a "1", as determined by an affirmative branch from block A32, then in block A34 the gaming board downloads the game schedule by calling the download game schedule routine. If the command is a "2", as determined by an affirmative branch from block A36, then in block A38 the gaming board downloads the game information by calling the download game information routine. In block A40 an affirmative branch calls the download special instructions routine in block A42 to transfer coding to the gaming board 12. Similarly, in block A52 an affirmative branch calls for the downloading of game cards to the gaming board 12. On a command of "5", control of the program is transferred from block A48 to block A50, where the power supply is turned off by resetting the power supply bistable. The commands "1", "2", "3", "5" and "6" are generated to the gaming board 12 by the system base station 10. If the command is a "4", then the gaming board 12 uploads game information in block A46 by calling the upload game information routine. A command of "4" is generated by a validation unit 14.

A command of "6" downloads game cards into the gaming board 12. The downloading occurs under cashier control in block A54, while selling cards 92. These cards are stored in a random access file containing a game card array library 62. The game card array library 62 may be stored in a disk drive 26, such as a hard drive or a floppy drive. However, other memory means may be used to store the gaming card library, including magnetic tape, read-only memory chips (ROMs), or random-access memory chips (RAMs and DRAMs).

Figure 14:
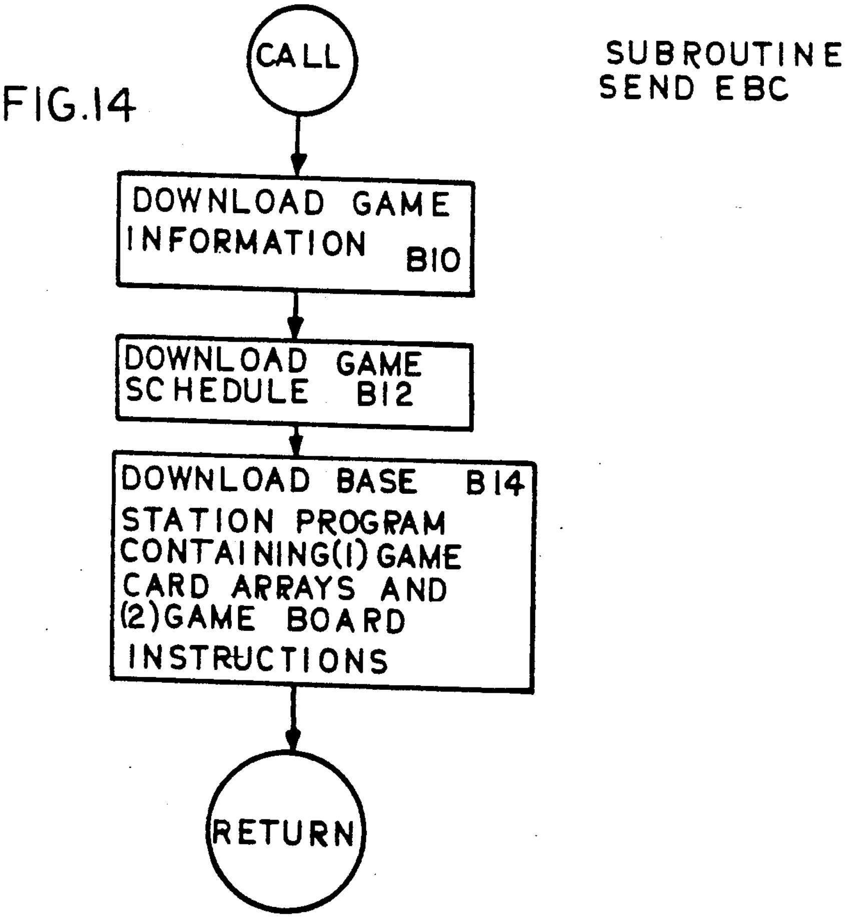
FIG. 14 is a flowchart of subroutine SEND EBC, executed by the system base station shown in FIG. 1, which downloads data into the gaming boards.

FIG. 14 is a flowchart of the subroutine SEND.EBC executed by the system base station 10 when the user desires to download data from the system base station 10 to the gaming boards 12. The user may access SEND.EBC while the system base station 10 is in the cashier operations mode. SEND.EBC is used to download game information, game schedules, and a base station program 46 into the gaming boards 12.

Subroutine SEND.EBC downloads game information to the gaming board 12 by calling another subroutine, SEND.GAME, at block B10. After a return from SEND.GAME, in block B12 subroutine SEND.EBC downloads the game schedule into the gaming board 12 by calling a subroutine, SEND.SCHED. After the system base station CPU 22 executes SEND.SCHED, program control returns to block B14 where subroutine FIRMWARE is called. FIRMWARE downloads the base station program 50 into the gaming board 12. The base station program 50 includes gaming board instructions 46 as well as individual game array records 52. Upon execution of FIRMWARE, program control at the system base station CPU 22 is returned to the cashier operations routine.

Figure 15:
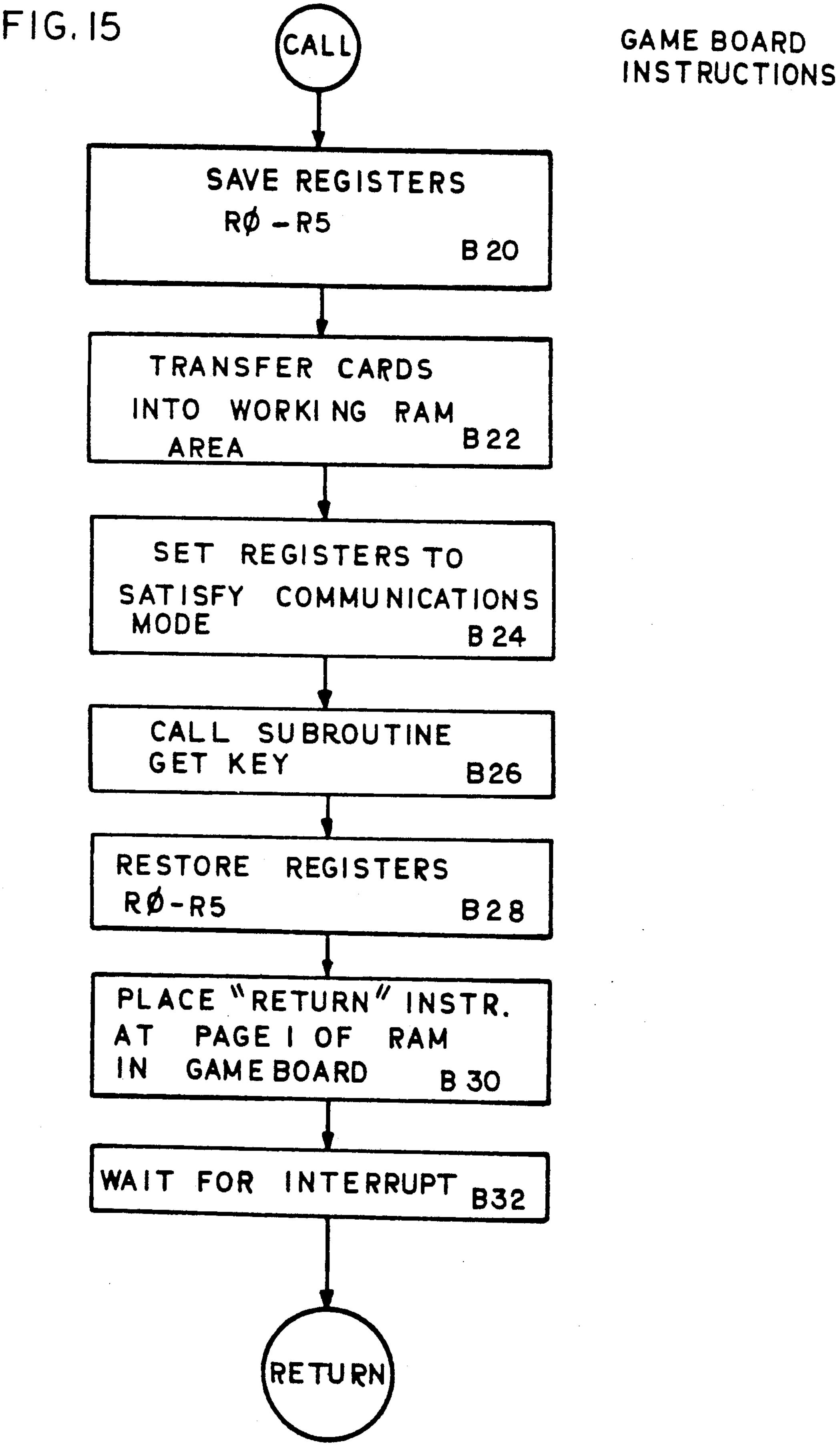
FIG. 15 is a flowchart of the gaming board instructions which are downloaded from the system base station of FIG. 1 into the gaming board of FIG. 4.

FIG. 15 is a flowchart setting forth the structure of the base station program 46 which is downloaded from the system base station 10 into the gaming boards 12. The base station program commences at block B20 by saving registers R0–R5 in the random-access memory of gaming board 12. These registers are saved so that the gaming board 12 can resume its activities after the base station program 46 has been executed. Then, at block B22, the individual gaming card arrays 52 are transferred from the gaming board External RAM 812 into the gaming board Working Storage Area 814. In block B24, registers R0–R5 are set to satisfy the communications mode. Next, a subroutine GET KEY is called from block B26 which retrieves a character from the keyboard on the gaming board 12. At block B28, registers R0–R5 are restored to their initial values. A "RETURN" command is placed at the beginning of External Ram Page 1, 816, in block B30. Block B32 waits for an interrupt; once an interrupt is received, the gaming board exits the subroutine and returns to play mode operation.

Figure 16A:
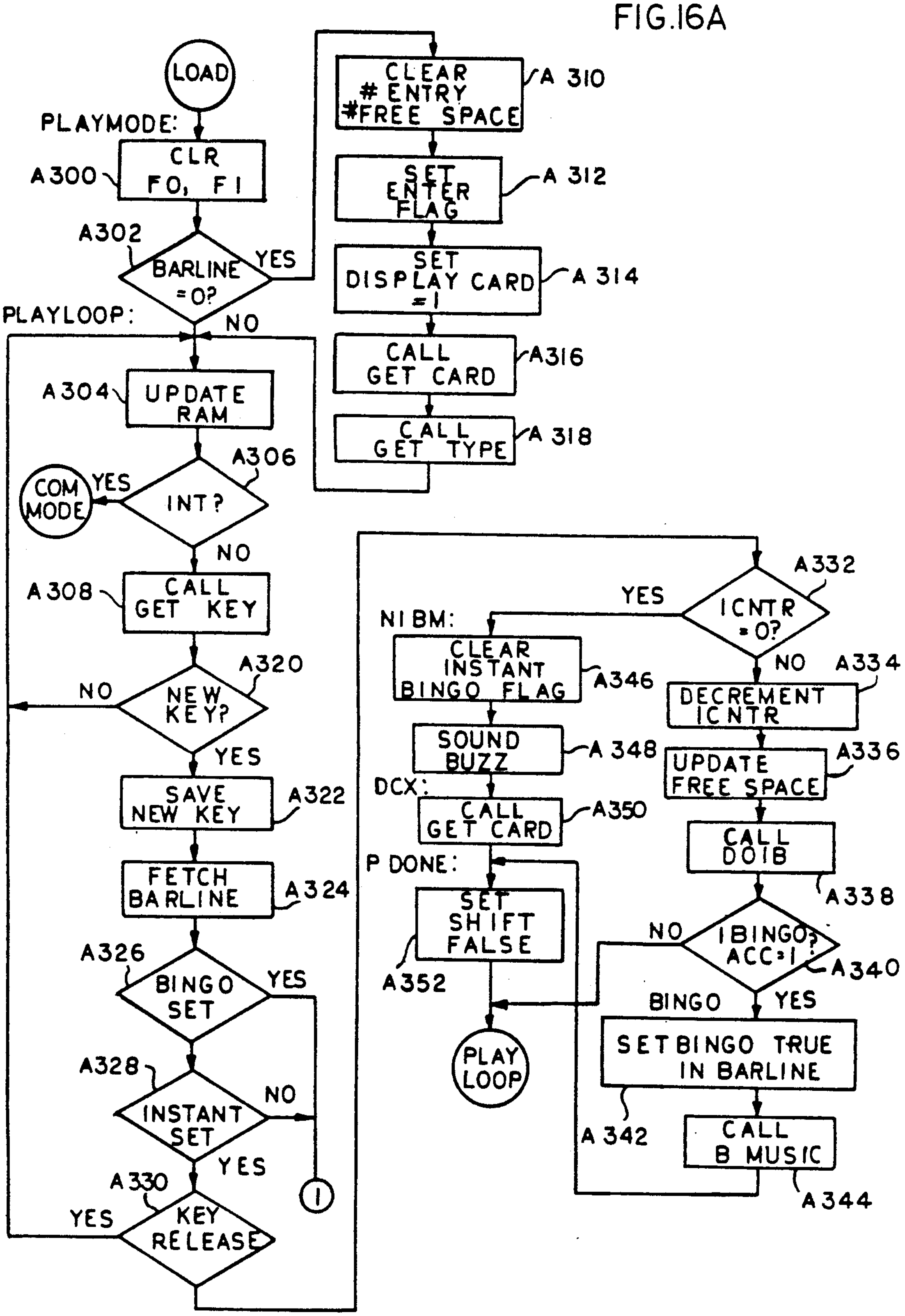
FIGS. 16A, 16B, and 16C together comprise a more detailed flowchart of the control program illustrated in FIGS. 12A and 12B.
Figure 16B:
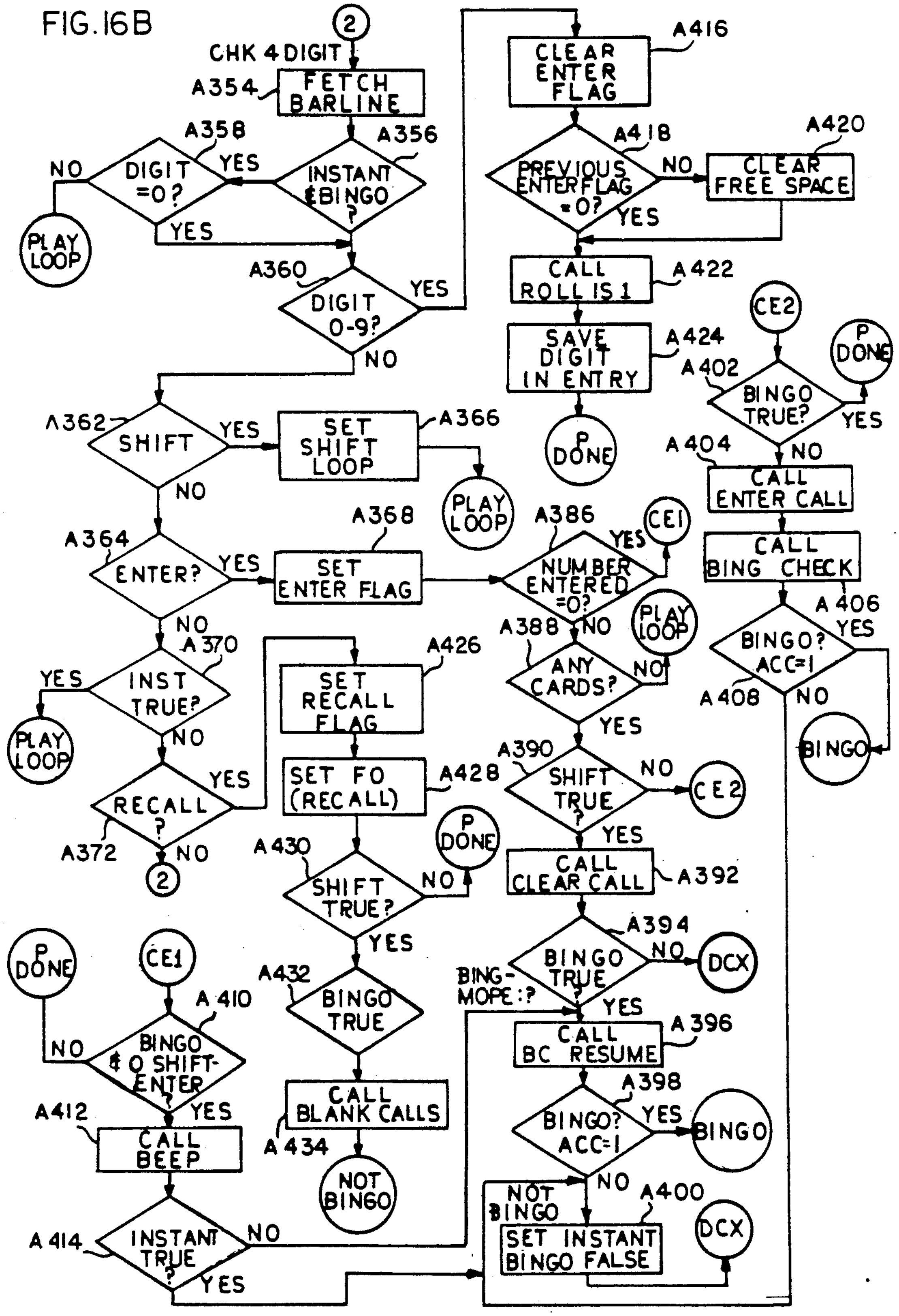
Figure 16C:
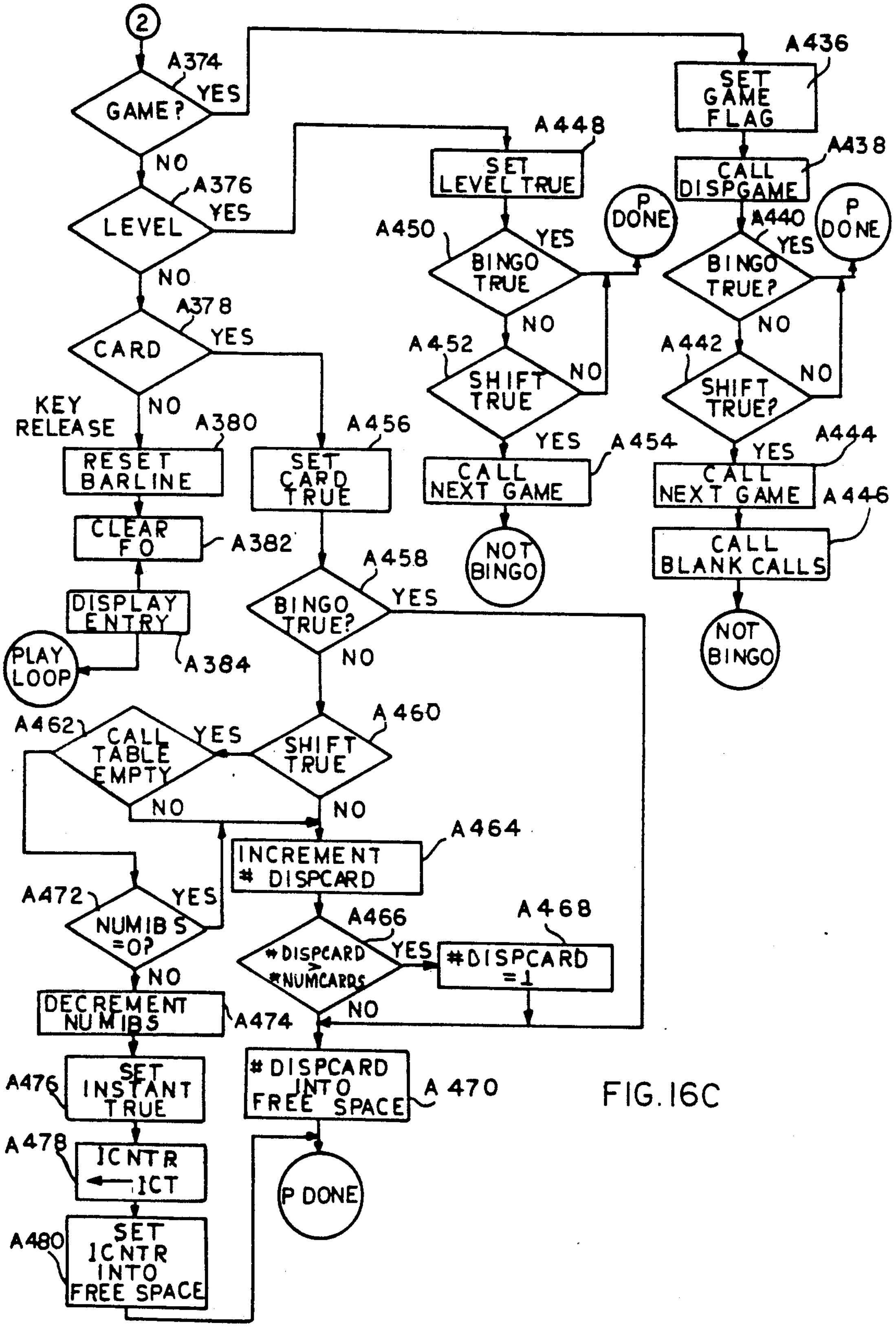

FIGS. 16A, 16B, and 16C together comprise a detailed flowchart of the play mode program for the gaming board 12. The program first clears the flag bits F0 and F1 in block A300 to set the play mode. Next in block A302, if the barline is clear, this indicates that the present pass is the first pass through the play mode, and therefore, a number of parameters must be initialized. This initialization process is performed in blocks A310–A318 where the memory locations storing the entry of a character and the free space are cleared in block A310, the enter flag is set in block A312, and the number of the card to be displayed is set to 1 in block A314. Thereafter, a subroutine labeled GET CARD is called in block A316 to obtain the stored numbers for the first card array so that they can be either matched or displayed. The subroutine GET CARD moves the array symbols from intermediate RAM storage to display storage. In addition, the type of card is fetched by calling the subroutine labeled GET TYPE in block A318.

After the initialization, the program transfers control to block A304 where the RAM memory is updated. If this is not the first pass through the play mode, then the negative branch from block A302 directly transfers control to block A304. After initialization of the RAM in block A304, block A306 tests for an interrupt. If the interrupt is present, this indicates that the gaming board 12 is connected to either the system base station 10 or the validation unit 14 and a communications request is present. The gaming board 12 will, in response to the request, exit to the communications mode. If there is no communications request, in block A308 the program calls the subroutine GET KEY which reads the key input from the key scan routine. Block A320 determines if a new key has been input. Upon the receipt of a new key, it is saved in block A322; otherwise, the program returns to the address PLAYLOOP in block A304. In this manner the program will continuously scan for a new key and if it does not find one, return to the beginning of the loop to check for a communications request. After a new key has been found, and saved in block A322, the program continues to block A324 where the status of the gaming board is determined by fetching the annunciator byte. In blocks A326 and A328, the status bits are tested to determine whether bingo is set and whether the instant annunciator is set.

If the bingo annunciator is not set (block A326) and the instant annunciator is set (block A328), the program affirmatively branches to block A330. The program in block A330 tests the key input to determine if it was merely a key release. If the new key is merely a release of the present key, the program will exit back to the address PLAYLOOP, block A304. However, if there is an actual new key and the instant annunciator is set, then the program will begin to play instant bingo. This loop is entered through block A332 where the address ICNTR is tested to determine whether or not it is zero. This address is used to store the number of key pushes that a player is allowed in an attempt to win at an instant game. If the instant counter is zero, as determined by an affirmative branch from block A332, then the game is finished and the instant bingo flag is cleared in block A346. Further, in block A348 a buzzing sound is generated to alert the player that he has lost the instant game. Next, in block A350, the subroutine GETCARD is again called to obtain the next card array in line, so that if there are more instant bingo games, the program re-enters this mode at block A304. Before leaving the loop, at block A352 the shift bit is set false.

However, if the instant counter ICNTR is not zero, the player still has a number of pushes with which to win at instant bingo. Therefore, the negative branch from block A332 continues the program at block A334 where the counter ICNTR is decremented. This number is then placed into the free space in block A336 to inform the player of how many pushes he is still allowed. Thereafter, in block A338, the subroutine DOIB is called to select a random number and to match it against the card in play. The subroutine DOIB returns to the main program loop with the accumulator set to either 0 or 1, indicating that instant bingo has been lost or won, respectively. If the program returns with the accumulator set to 1, program control is transferred to block A342 where the bingo annunciator is set. To alert the player that a bingo for the instant mode has been found, a characteristic tune is played in block A344 with the tone generator by calling the subroutine BMUSIC. Thereafter, the program exits back to PLAYLOOP, block A304, after setting the shift annunciator bit in block A352.

When it is determined that the instant annunciator has not been set and the gaming board is either in a bingo or not bingo mode, the program will continue to blocks A354 and A356 where the status of the board is tested. The annunciators are fetched in block A354 and tested in block A356 to determine whether the instant and bingo annunciators are both set. If both are set, the program moves to block A358, where the input DIGIT is tested. When DIGIT is 0, this signifies that the player has pushed the key sequence 0-Shift-Enter on the gaming board 12, which will reset the gaming board from the bingo mode to the regular play mode. Consequently, if DIGIT is 0 (block A358), or if at least one annunciator is not set (block A356), the gaming board 12 will begin a path in blocks A360–A378. If DIGIT is not 0, the gaming board 12 should not input key strokes: therefore, the program will loop back to the address PLAYLOOP, block A304.

Block A360 decodes the character entered into the keyboard. If the entered key is a digit between 0 and 9, control will be transferred to block A416. If not, successive tests are performed at blocks A362, A364, A370, A372, A374, A376 and A378 until an affirmative answer is found or all the tests are negative. If the key entered is a shift command as sensed in block A362, then control will be transferred to block A366. If the command is an enter operation, then control will be transferred at block A364 to block A368.

At block A370, the program determines whether the instant annunciator bit is set. If the annunciator bit is true (1), then the program loops back to the address PLAYLOOP, block A304. However, if the annunciator bit is false (0), the program will continue decoding the new input key. In block A372, the recall instruction is decoded; if the test is affirmative, control is transferred to block A426. In block A374, the game key is tested; if the test is true, a path beginning with block A436 is initiated. In block A376, the level key is tested. If the test is affirmative, control is transferred to block A448. The last function to be tested is the card key in block A378. If the card key was pressed, the program will enter a subroutine at block A456.

However, if none of these keys have been entered, the gaming board 12 determines that an invalid request has been made and resets the bar line in block A380. Further, the recall mode is reset by clearing the function bit F0 in block A382. The key that was entered is displayed in block A384 before the program transfers to the address PLAYLOOP, block A304.

If the key entered was determined to be a numeric digit between 0 and 9, block A416 is executed where the enter flag bit is cleared. Block A418 checks for a previous enter flag bit and if there is one, that is, when the enter flag is not zero, block A420 clears both sides of the free space on the gaming board 12. If not, or after the free space is cleared, in block A422 a subroutine labelled ROLLIS 1 is called. The ROLLIS 1 subroutine places the first digit in the free space on the right-hand side, the left-hand side remaining cleared, i.e., 0. The digit that is in the free space is then saved in entry location ENTRY in block A424 before the program exits to the address PDONE, block A352. If a second digit is selected, the loop repeats, shifting program control back to block A422, where the subroutine ROLLIS1 rolls the first digit to the left-hand side of the free space and admits the second digit to be entered on the right-hand side of the free space. The second digit is saved at block A424, and the program again exits to PDONE, block A352. The player will presumably press the Enter key 210 after making the selection of digits.

If the Shift key was entered, block A366 sets the shift bit to true in block A366 before exiting to the address PLAYLOOP, block A304. Likewise, the enter flag is set in block A368 if the Enter key was pressed, as after the selection of digits. Control is then transferred to block A386 where the last digit entered is checked to determine whether or not it is a "0". If it is, then a path beginning at block A410 is initiated to determine whether a player has pressed the special key sequence of 0-Shift-Enter which instructs the gaming card to exit the bingo mode. If the test is not passed, then the negative branch from block A410 exits to the address PDONE at block A352. If a player has entered the special key sequence, the program continues to block A412 where a subroutine BEEP is called. This subroutine BEEP causes the gaming card 12 to emit audible tones, warning both the floor worker and the bingo player that the gaming card is no longer in the bingo mode.

Generally, this sequence is used to reset the card after a bingo has been validated by the instant annunciator bit in block A414. Then the program resumes its search for other bingos by calling the subroutine BCRESUME in block A396. The subroutine BCRESUME places a "1" in the accumulator if any of the remaining cards contain winning bingo patterns. At block A398, a positive test transfers control to block A342 where the bingo annunciator is set. The gaming board plays the winning bingo tune by calling the subroutine BMUSIC in block A344. However, if no bingo is found in the rest of the cards and the instant annunciator was not set in block A414, the instant and bingo annunciators are cleared in block A400 before the program exits to the address DCX. An exit to this address produces a call to the subroutine GET CARD to set the next card in block A350. The shift annunciator is cleared in block A352 before exiting to PLAYLOOP in block A304.

If the desired operation is the routine entry of a called number to be checked against the card arrays, the negative branch of the test in block A386 continues the program to block A388, where, if there are no cards to be played, the program exits to the address PLAYLOOP at block A304. However, if there are cards, the shift annunciator is tested in block A390. If true, the program will continue to block A402, where the bingo annunciator is tested. A true bit in block A402 will cause the program to exit to address PDONE.

If the bingo annunciator bit is not set, this indicates the routine entry of a called number, thereupon, the subroutine ENTERCALL will be called in block A404. This subroutine enters the two digits of a called number into the call table so that all the enabled bingo card arrays in present play can be checked against the call table. After the bit in the call table is set, the table is matched against all the cards by a subroutine BING CHECK in block A406. The subroutine BING CHECK will return with the accumulator set at 1 if a bingo is found. The bingo condition is tested in block A408; if the accumulator contains a "1", control is transferred to the address BINGO, block A342. If there is no bingo at this point, then the program loops back to block A400 where the instant flag and the bingo flag in the annunciator bar are cleared. The program thereafter exits to the address PLAYLOOP after performing the operations in blocks A350 and A352.

Figure 17:
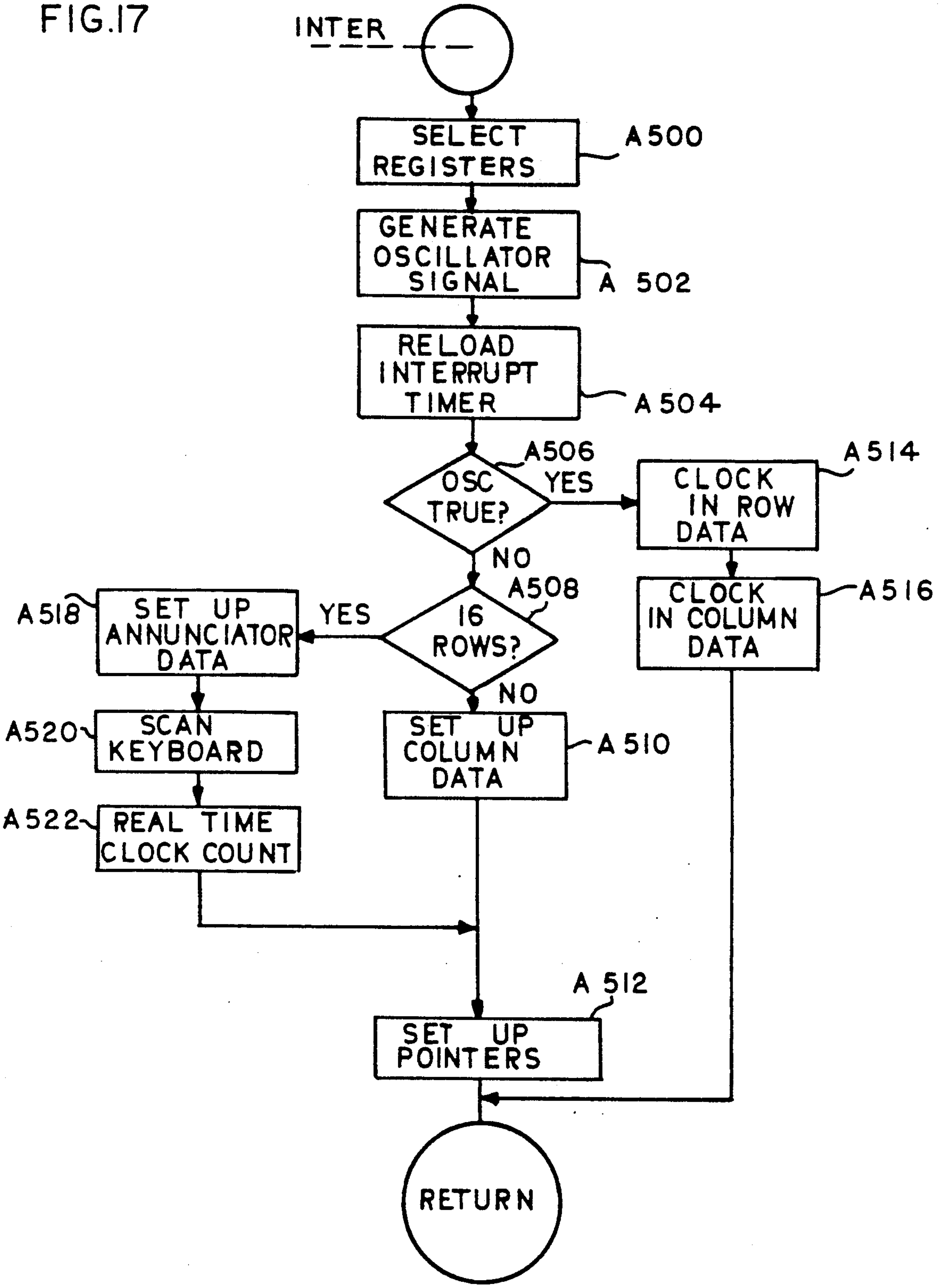
FIG. 17 is a detailed flowchart of the interrupt routine included in the control program illustrated in FIGS. 12A and 12B.
Figure 18:
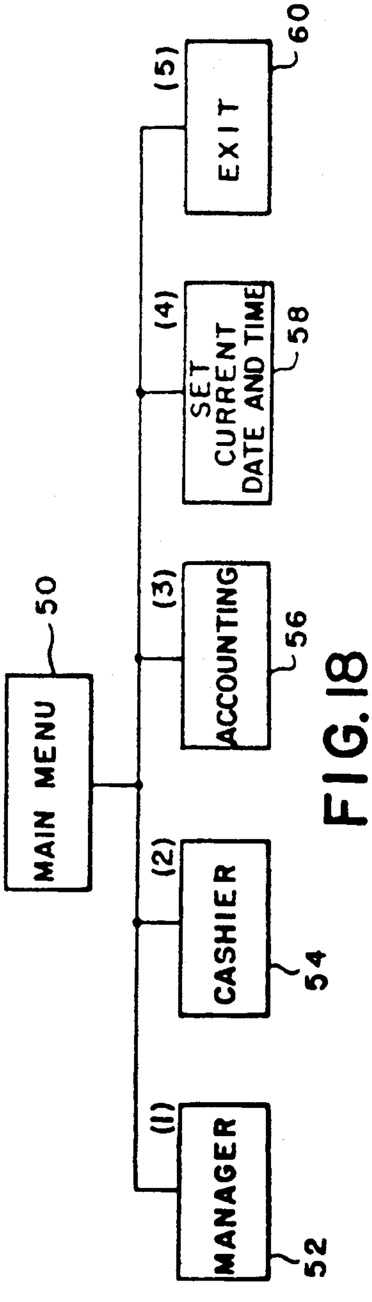
Figure 19:
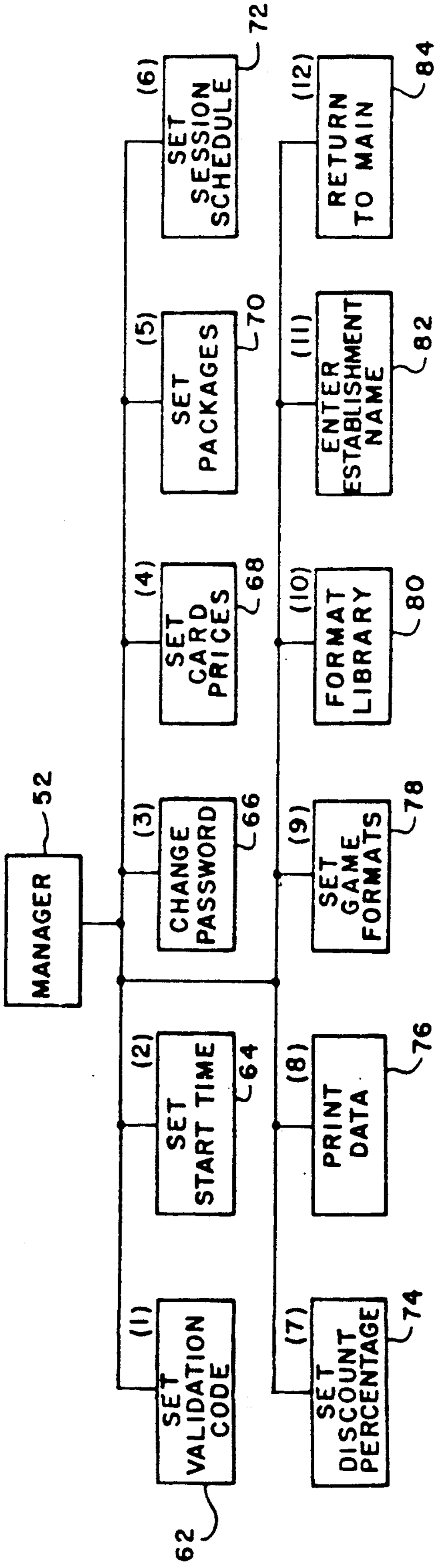
Figures 20, 21, 22:
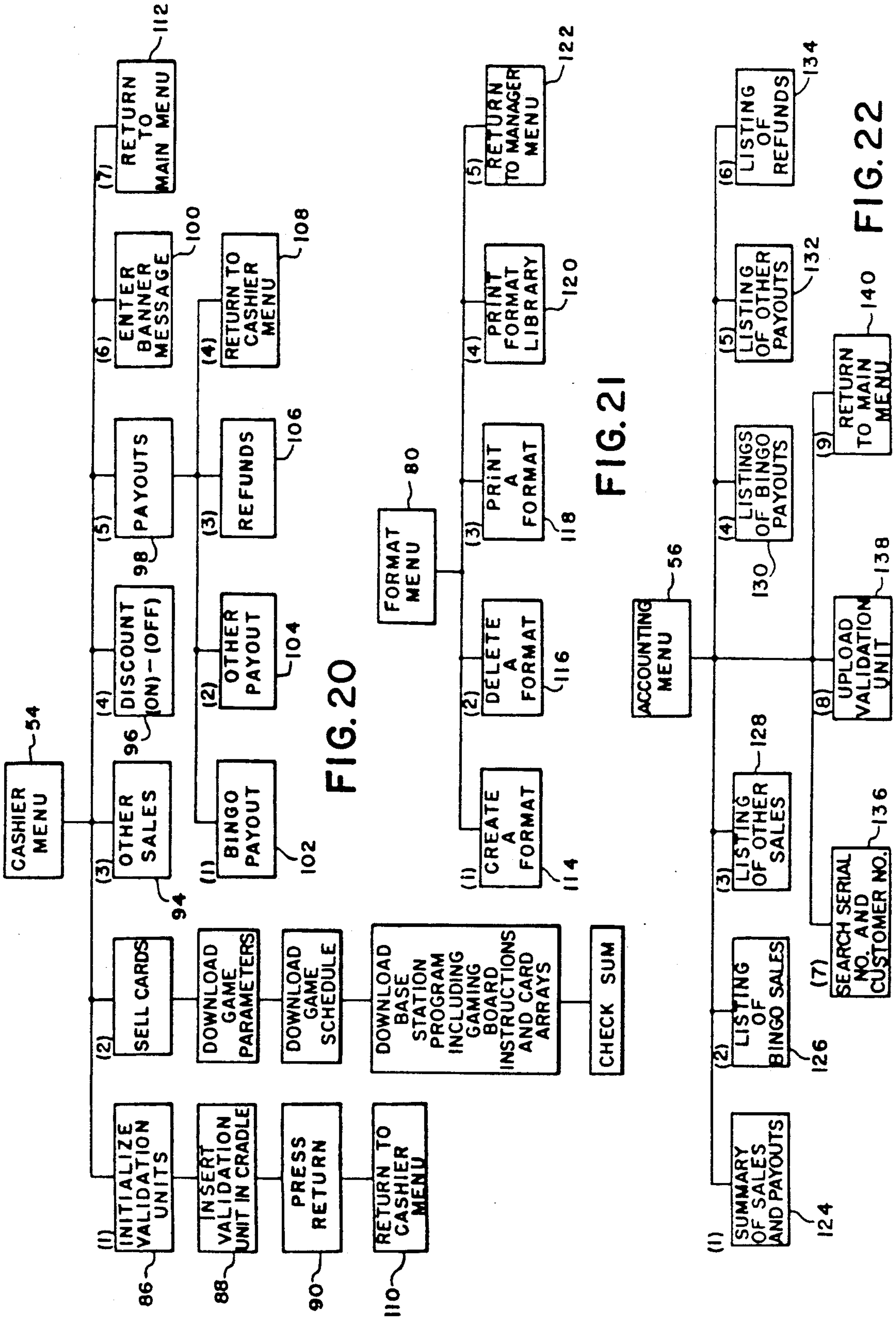

FIG. 17 is a detailed flowchart of the interrupt routine illustrated in FIGS. 12A and 12B. When an interrupt occurs from the internal timer, program control is transferred to block A500, where the background bank of registers is selected. This register bank is used by the interrupt routine which may store information between interrupts. Therefore, the main routine should operate without using or modifying the contents of these registers. Next, in block A502, the routine generates the oscillator signal LCDOSC from pin 20 of the microprocessor 300. The master time clock for the display must be toggled precisely every 960 microseconds and cannot wait until other tasks in the main program are completed. Therefore, the counter-timer circuit inside the microprocessor is used to generate an interrupt every 960 microseconds. After the oscillator signal has been generated, in block A504 the timer is reloaded to begin timing for the next interrupt.

Alternate paths are now taken from block A506 depending upon the outcome of a test that determines whether the oscillator logic level is high or low. If LCDOSC is low, a test for 16 rows is made in block A508, until 16 rows have been attained. A negative test result advances the program to block A510 where a string of column data is prepared to be sent to the LCD driver circuits on the next interrupt. If LCDOSC is high, blocks A514 and A516 shift the previously-prepared data into the driver circuits. When the 16 rows have been attained as tested in block A508, the data setup routine sets up annunciator bar data at block A518 as well as data which will drive the seven-segment digital display. The data for the display is completely set up after fifteen passes through the loop; the sixteenth pass sets up the data for the annunciator bar. During the sixteenth pass, the keyboard scan and real-time clock functions are performed in blocks A520 and A522, respectively. Block A508 transfers control either to block A518 or to block A510, depending upon the number of times the loop has been executed.

The data to be displayed are stored in the 26 bytes of the display storage. The display storage is logically organized as five groups of five bytes where each byte holds two digits. One additional byte holds the eight annunciator bits. In this manner, the main program merely writes a byte to the appropriate location in the display storage. The byte will show up on the display after the interrupt-driven display routine is performed. The display data setup routine in blocks A510 and A512 examines a group of five bytes, looks up the appropriate segment bits from a table, and places the segment bits in a segment storage area. During the next interrupt, the transmit routine in blocks A514 and A516 sends the bits from the storage area to the display hardware. On the sixteenth time through the setup routine, the lookup table is addressed for the annunciator bits.

On every 32nd interrupt, the keyboard scan and real-time clock routines in blocks A520 and A522 are executed. The keyboard scan loop probes each of the four rows of the 4×4 keypad with a low logic level and looks for a low logic level on one of the column pins. If exactly one row makes exactly one column go low, then one and only one key has been pressed. The row/-column pattern is converted to a numerical value by means of a lookup table. If the same key is actuated on two consecutive passes through the keyboard scan routine, then a valid key is detected. If a transition from an invalid key to a valid key is detected, then a flag byte is set to inform the main program that a new key is available. At the same time, the activity counter in block A15 is reinitialized to ten minutes.

The real-time clock routine follows the keyboard scan. On every pass through the real-time clock routine, an interrupt is counted which represents 1/33 of a second. When a second has been counted, the counter is updated and can be tested by the main routine to determine the time interval since the last key activation. When the activity counter times out, indicating that a key has not been pressed for ten minutes, the gaming board 12 turns off the display power supply to conserve power, and the microprocessor 300 enters an idle loop. In this idle loop, the microprocessor 300 waits for a key to be pressed or for input from an external device. If neither of these events occurs within two hours, the microprocessor 300 will turn off the main power supply and power down completely. If a key is activated after the display power is turned off, but before the main power supply is shut down, the gaming board 12 simply resumes normal operations and executes the required programming steps for interpreting the key. However, once the main power has been shut off, a reconnection to the system base station 10 is required for initialization before power can be turned back on.

While a preferred embodiment of the invention has been illustrated, it will be obvious to those skilled in the art that various modifications and changes may be made thereto without departing from the spirit and scope of the invention.

What is claimed is:

1. An electronic gaming system for playing a game which requires a plurality of gaming card arrays each formed from a plurality of symbols positioned in predetermined symbol display locations, said gaming system comprising:

(a) a system base station comprising:

a game card array production means for producing a series of unique gaming card arrays each of which complies with the rules of a game, each gaming card array comprising data representing a plurality of symbols, a plurality of said gaming card arrays together comprising a gaming card library;

a base station communication port;

request means for requesting at least one gaming card array for a game participant;

system base station data transfer means responsive to said request means for retrieving at least one of said gaming card arrays from said gaming card array production means and for presenting it to said base station communications port;

(b) a plurality of gaming boards each comprising:

a gaming board communications port designed to exchange information with said base station communications port;

memory means for storing gaming card arrays;

gaming board data transfer means responsive to the receipt of a gaming card array at said gaming board communications port for transferring said gaming card array from said gaming board communications port to said memory means; and game playing means for playing said game utilizing at least one gaming card array in said memory means, wherein said system base station data transfer means includes means for presenting a game code number unique to a specific gaming session to said gaming board communications port (c) means for applying the game code number to validate a win condition of a gaming board.

2. An electronic gaming system as set forth in claim 1, wherein said system base station data transfer means presents a player code unique to a specific player to said gaming board communications port.

3. An electronic gaming system as set forth in claim 1 wherein said system base station data transfer means presents a gaming schedule to said gaming board communications port, said gaming schedule governing the order in which each said gaming card array should be utilized by said gaming board game playing means.

4. An electronic gaming system as set forth in claim 1, further comprising at least one portable validation unit for validating a win condition of said gaming boards, said validation unit comprising:

reception means for receiving validation data from said system base station, said validation data including the game code number, a player code number, and a gaming card library number; and said reception means further including means for receiving validation data from said gaming board, said gaming board validation data including the game code number, a player code number, and a gaming card library number, after said gaming board generates a win indication.

* * * * *